United States Patent
Tyan et al.

(10) Patent No.: US 9,845,112 B2
(45) Date of Patent: Dec. 19, 2017

(54) TWELVE-CORNERED STRENGTHENING MEMBER, ASSEMBLIES INCLUDING A TWELVE-CORNERED STRENGTHENING MEMBER, AND METHODS OF MANUFACTURING AND JOINING THE SAME

(71) Applicant: FORD GLOBAL TECHNOLOGIES, LLC., Dearborn, MI (US)

(72) Inventors: Tau Tyan, Northville, MI (US); Yu-Kan Hu, Ypsilanti, MI (US); Leonard Anthony Shaner, New Baltimore, MI (US); Ajay Kumar Gupta, Troy, MI (US); Mark Wlotkowski, Royal Oak, MI (US); Narayana Venugopal, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/942,385

(22) Filed: Nov. 16, 2015

(65) Prior Publication Data

US 2016/0068194 A1 Mar. 10, 2016

Related U.S. Application Data

(63) Continuation of application No. 14/559,671, filed on Dec. 3, 2014, now Pat. No. 9,187,127, which is a (Continued)

(51) Int. Cl.
*B62D 21/15* (2006.01)
*B60R 19/34* (2006.01)
(Continued)

(52) U.S. Cl.
CPC .......... *B62D 21/152* (2013.01); *B62D 21/15* (2013.01); *B62D 25/00* (2013.01); *B60R 19/34* (2013.01);
(Continued)

(58) Field of Classification Search
CPC ......... B60R 19/24; B60R 19/26; B60R 19/34; B62D 21/02; B62D 21/15; B62D 21/152; B62D 21/155; B62D 28/08; B62D 28/085
(Continued)

(56) References Cited

U.S. PATENT DOCUMENTS 2,205,893 A 6/1840 Unger
1,951,292 A 3/1934 Cahill
(Continued)

FOREIGN PATENT DOCUMENTS

JP 08-337183 12/1996
JP 3897542 B2 1/2007
(Continued)

OTHER PUBLICATIONS

Extended European Search Report for Application No. 15195185.2, dated May 19, 2016.
(Continued)

*Primary Examiner* — Jason S Daniels
(74) *Attorney, Agent, or Firm* — Jones Robb, PLLC; Jason Rogers

(57) ABSTRACT

A motor vehicle assembly that includes a strengthening member having a twelve-cornered cross section along at least a portion of the strengthening member, and an automotive component having a four-cornered cross section along at least a portion of the automotive component. The cross section of one of the strengthening member and the automotive component transitions between twelve corners
(Continued)

and four corners to facilitate a connection between the strengthening member and the automotive component.

20 Claims, 22 Drawing Sheets

Related U.S. Application Data continuation-in-part of application No. 14/010,115, filed on Aug. 26, 2013, now Pat. No. 9,174,678, which is a continuation of application No. 12/233,808, filed on Sep. 19, 2008, now Pat. No. 8,539,737.

(51) Int. Cl.
*B62D 25/00* (2006.01)
*F16F 7/12* (2006.01)

(52) U.S. Cl.
CPC ......... *F16F 7/128* (2013.01); *Y10T 29/49622* (2015.01)

(58) Field of Classification Search
USPC ............ 296/187.03, 187.09, 187.11, 193.07, 296/193.08, 193.09, 203.01, 203.02, 296/203.04, 205, 132, 133; 52/843
See application file for complete search history.

(56) References Cited

U.S. PATENT DOCUMENTS

| | | |
|---|---|---|
| 2,340,003 A | 1/1944 | McDermot |
| 2,837,347 A | 6/1958 | Barenyi |
| 2,856,226 A | 10/1958 | Purdy |
| 3,092,222 A | 6/1963 | Heinle |
| 3,209,432 A | 10/1965 | Cape |
| 3,412,628 A | 11/1968 | De Gain |
| 4,018,055 A | 4/1977 | Clercq |
| 4,364,216 A | 12/1982 | Koller |
| 5,431,445 A | 7/1995 | Wheatley |
| 5,480,189 A | 1/1996 | Davies et al. |
| 5,729,463 A | 3/1998 | Koenig et al. |
| 5,913,565 A | 6/1999 | Watanabe |
| 6,068,330 A | 5/2000 | Kasuga et al. |
| 6,179,355 B1 | 1/2001 | Chou et al. |
| 6,371,540 B1 | 4/2002 | Campanella et al. |
| 6,523,576 B2 | 2/2003 | Imaeda et al. |
| 6,588,830 B1 | 7/2003 | Schmidt et al. |
| 6,705,653 B2 | 3/2004 | Gotanda et al. |
| 6,752,451 B2 | 6/2004 | Sakamoto et al. |
| 6,799,794 B2 | 10/2004 | Mochidome et al. |
| 6,893,065 B2 | 5/2005 | Seksaria et al. |
| 7,044,515 B2 | 5/2006 | Mooijman et al. |
| 7,252,314 B2 | 8/2007 | Tamura et al. |
| 7,264,274 B2 | 9/2007 | Ridgway |
| 7,303,219 B2 | 12/2007 | Trabant et al. |
| 7,357,445 B2 | 4/2008 | Gross et al. |
| 7,407,219 B2 | 8/2008 | Glasgow et al. |
| 7,445,097 B2 | 11/2008 | Tamura et al. |
| 7,926,160 B2 | 4/2011 | Zifferer et al. |
| 8,459,726 B2 | 6/2013 | Tyan et al. |
| 8,469,416 B2 | 6/2013 | Haneda et al. |
| 8,539,737 B2 | 9/2013 | Tyan et al. |
| 8,641,129 B2 | 2/2014 | Tyan et al. |
| 8,659,659 B2 | 2/2014 | Bradai et al. |
| 2002/0059087 A1 | 5/2002 | Wahlbin et al. |
| 2002/0153719 A1 | 10/2002 | Taguchi |
| 2003/0085592 A1 | 5/2003 | Seksaria et al. |
| 2005/0028710 A1 | 2/2005 | Carpenter et al. |
| 2006/0033363 A1 | 2/2006 | Hillekes et al. |
| 2006/0181072 A1 | 8/2006 | Tamura et al. |
| 2006/0202493 A1 | 9/2006 | Tamura et al. |
| 2006/0202511 A1 | 9/2006 | Tamura et al. |
| 2006/0249342 A1 | 11/2006 | Canot et al. |
| 2008/0012386 A1 | 1/2008 | Kano et al. |
| 2008/0030031 A1 | 2/2008 | Nilsson et al. |
| 2008/0036242 A1 | 2/2008 | Glance et al. |
| 2008/0098601 A1 | 5/2008 | Heinz et al. |
| 2008/0106107 A1 | 5/2008 | Tan et al. |
| 2008/0185852 A1 | 8/2008 | Suzuki et al. |
| 2009/0026777 A1 | 1/2009 | Schmid et al. |
| 2009/0085362 A1 | 4/2009 | Terada et al. |
| 2009/0102234 A1 | 4/2009 | Heatherington et al. |
| 2009/0174219 A1 | 7/2009 | Foreman |
| 2010/0064946 A1 | 3/2010 | Watson |
| 2010/0066124 A1 | 3/2010 | Terada et al. |
| 2010/0072788 A1 | 3/2010 | Tyan et al. |
| 2010/0102592 A1 | 4/2010 | Tyan et al. |
| 2011/0015902 A1 | 1/2011 | Cheng et al. |
| 2011/0102592 A1 | 5/2011 | Bradai et al. |
| 2012/0261949 A1 | 10/2012 | Tyan et al. |
| 2013/0300138 A1 | 11/2013 | Banasiak et al. |
| 2013/0341115 A1 | 12/2013 | Tyan et al. |
| 2015/0197206 A1 | 7/2015 | Tamura et al. |
| 2016/0052557 A1 | 2/2016 | Tyan et al. |

FOREIGN PATENT DOCUMENTS

| | | |
|---|---|---|
| JP | 2008261493 A | 10/2008 |
| JP | 04-371059 A | 11/2009 |
| JP | 5348910 B2 | 8/2013 |
| JP | 2015124784 A | 7/2015 |

OTHER PUBLICATIONS

Office Action dated Dec. 17, 2015 from U.S. Appl. No. 12/891,801.
PABR filed on Mar. 17, 2016 PABR in Response to NFOA dated Dec. 17, 2015 from U.S. Appl. No. 12/891,801.
Machine translation for JP08-337183.
JP08-337183 English Abstract.
Ali Najafi et al., "Mechanics of Axial Plastic Collapse in Multi-Cell, Multi-Corner Crush Tubes," sciencedirect.com, Sep. 1, 2010.
Xiong Zhang et al., "Crushing Analysis of Polygonal Columns and Angle Elements," sciencedirect.com, Jun. 27, 2009.
Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.
Fyllingen et al., "Simulations of a Top-Hat Section Subjected to Axial Crushing Taking Into Account Material and Geometry Variations," sciencedirect.com, Jul. 31, 2008.
Minoru Yamashita et al., "Quasi-Static and Dynamic Axial Crushing of Various Polygonal Tubes," sciencedirect.com, Jun. 2007.
Comparison of Energy Absorption of Various Section Steel Tubes under Axial Compression and Bending Loading, The 21st Conference of Mechanical Engineering network of Thailand, Oct. 19, 2007. p. 590-593. (See IDS of Sep. 23, 2014 for U.S. Appl. No. 12/891,801).
Yoshiaka Nakazawa et al., "Development of Crash-Box for Passenger Car With High Capability for Energy Absorption", VIII International Conference on Computation Plasticity (COMPLAS VIII), Barcelona, 2005.
Office Action dated Aug. 17, 2012 from U.S. Appl. No. 13/087,663.
Nov. 16, 2012 Response to Office Action dated Aug. 17, 2012 from U.S. Appl. No. 13/087,663.
Office Action dated Mar. 2, 2015 from U.S. Appl. No. 14/010,115.
Office Action dated Mar. 16, 2015 from U.S. Appl. No. 14/010,115.
Office Action dated Sep. 15, 2014 from U.S. Appl. No. 13/902,116.
Dec. 12, 2014 Response to Office Action dated Sep. 15, 2014 from U.S. Appl. No. 13/902,116.
Office Action dated Aug. 19, 2011 from U.S. Appl. No. 12/233,808.
Nov. 11, 2011 Response to Office Action dated Aug. 19, 2011 from U.S. Appl. No. 12/233,808.
Office Action dated Mar. 7, 2012 from U.S. Appl. No. 12/233,808.
Jun. 6, 2012 Response to Office Action dated Mar. 7, 2012 from U.S. Appl. No. 12/233,808.

(56) References Cited

OTHER PUBLICATIONS

Office Action dated Jul. 31, 2012 from U.S. Appl. No. 12/233,808.
Oct. 31, 2012 Response to Office Action dated Jul. 31, 2012 from U.S. Appl. No. 12/233,808.
Office Action dated Feb. 27, 2013 from U.S. Appl. No. 12/233,808.
Apr. 29, 2013 Response to Office Action dated Feb. 27, 2013 from U.S. Appl. No. 12/233,808.
Office Action dated Jul. 20, 2012 from U.S. Appl. No. 12/651,614.
Oct. 22, 2012 Response to Office Action dated Jul. 20, 2012 from U.S. Appl. No. 12/651,614.
Office Action dated Feb. 21, 2013 from co-pending U.S. Appl. No. 12/651,614.
Apr. 22, 2013 Response to Office Action dated Feb. 21, 2013 from U.S. Appl. No. 12/651,614.
Advisory Action dated May 6, 2013 from co-pending U.S. Appl. No. 12/651,614.
Office Action dated Jun. 6, 2013 from U.S. Appl. No. 12/651,614.
Sep. 5, 2013 Response to Office Action dated Jun. 6, 2013 from U.S. Appl. No. 12/651,614.
Office Action dated Jun. 28, 2013 from U.S. Appl. No. 12/891,801.
Sep. 27, 2013 Response to Office Action dated Jun. 28, 2013 from U.S. Appl. No. 12/891,801.
Office Action dated Jan. 16, 2014 from U.S. Appl. No. 12/891,801.
Mar. 18, 2014 Response to Office Action dated Jan. 16, 2014 from U.S. Appl. No. 12/891,801.
Office Action dated Apr. 25, 2014 from U.S. Appl. No. 12/891,801.
Jul. 23, 2014 Response to Office Action dated Apr. 25, 2014 from U.S. Appl. No. 12/891,801.
Office Action dated Nov. 6, 2014 from U.S. Appl. No. 12/891,801.
May 21, 2013 Response to Office Action dated Feb. 21, 2013 from U.S. Appl. No. 12/651,614.
Office Action dated Jul. 18, 2014 from U.S. Appl. No. 14/010,115.
Oct. 20, 2014 Response to Office Action dated Jul. 18, 2014 from U.S. Appl. No. 14/010,115.
Office Action dated Jan. 3, 2014 from U.S. Appl. No. 14/010,115.
Apr. 3, 2014 Response to Office Action dated Jan. 3, 2014 from U.S. Appl. No. 14/010,115.
Final Office Action dated May 16, 2017 from co-pending U.S. Appl. No. 14/930,299.

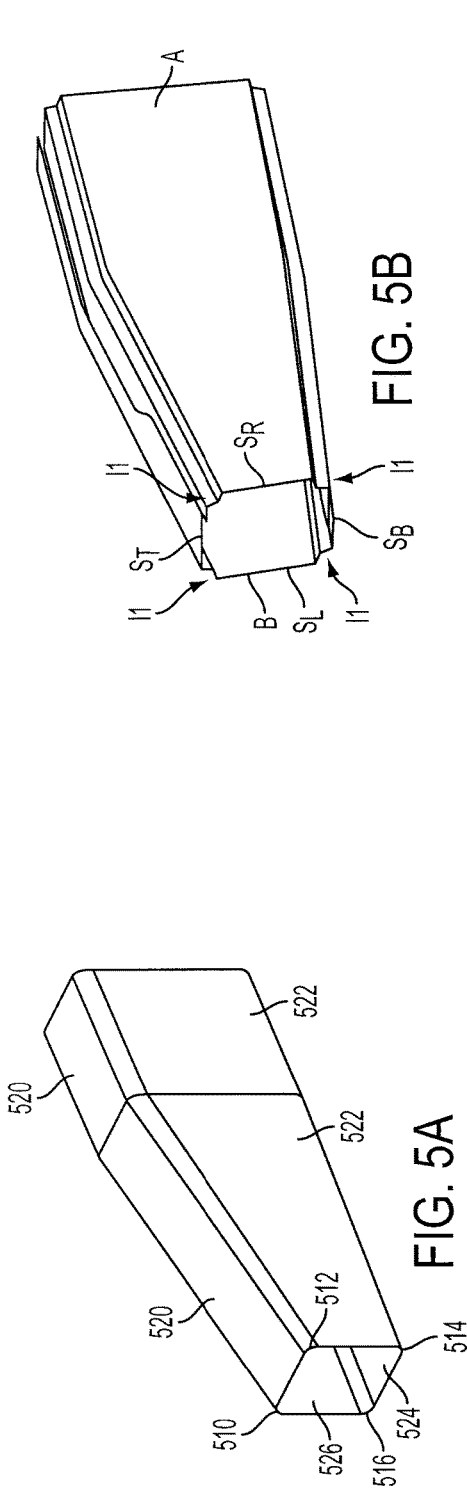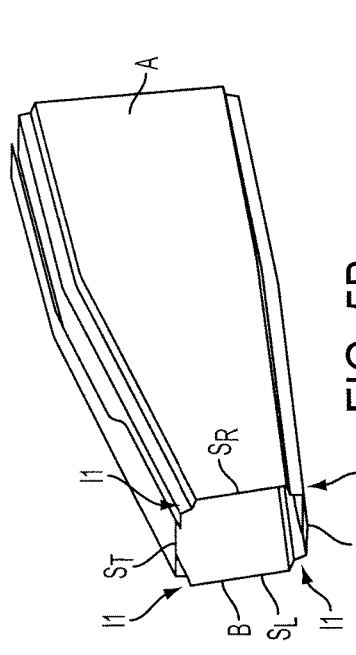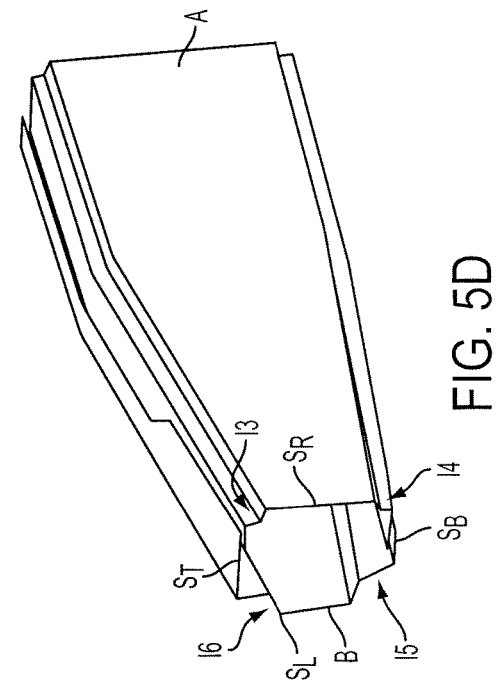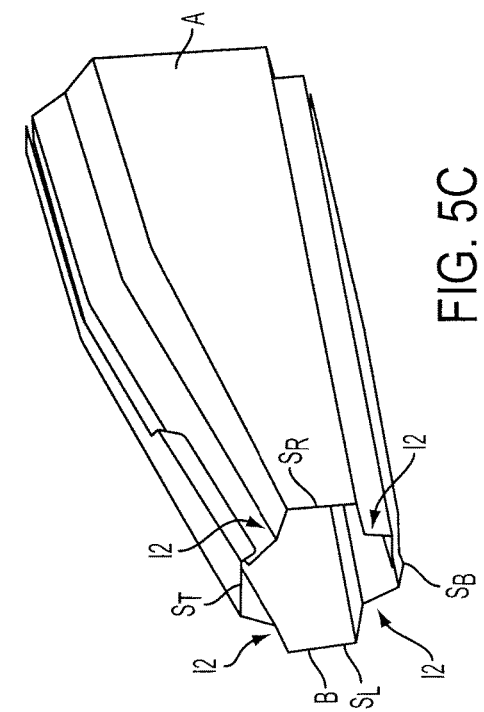
FIG. 5A
FIG. 5B
FIG. 5C
FIG. 5D

TWELVE-CORNERED STRENGTHENING MEMBER, ASSEMBLIES INCLUDING A TWELVE-CORNERED STRENGTHENING MEMBER, AND METHODS OF MANUFACTURING AND JOINING THE SAME

CROSS REFERENCE TO RELATED APPLICATIONS

This application is a continuation of U.S. patent application Ser. No. 14/559,671, filed Dec. 3, 2014, which is a continuation-in-part of U.S. patent application Ser. No. 14/010,115, filed Aug. 26, 2013, now U.S. Pat. No. 9,174,678, which is a continuation of U.S. patent application Ser. No. 12/233,808, filed Sep. 19, 2008, now U.S. Pat. No. 8,539,737, the entire content of each of which is incorporated herein by reference.

TECHNICAL FIELD

The present teachings relate generally to a strengthening assembly for a vehicle body or other structures. The present teachings relate more specifically to a strengthening member, motor vehicle assemblies including a strengthening member, connected to another automotive component, and methods of making and joining the strengthening member and assemblies.

BACKGROUND

It is desirable, for vehicle strengthening members, to maximize impact energy absorption and bending resistance while minimizing mass per unit length of the strengthening member. Impact energy absorption may be maximized, for example, by assuring that the strengthening member compacts substantially along a longitudinal axis of the strengthening member upon experiencing an impact along this axis. Such longitudinal compaction may be referred to as a stable axial crush of the strengthening member.

When a compressive force is exerted on a strengthening member, for example a force due to a front impact load on a vehicle's front rail or other strengthening member in the engine compartment, the strengthening member can crush in a longitudinal direction to absorb the energy of the collision. In addition, when a bending force is exerted on a strengthening member, for example a force due to a side impact load on a vehicle's front side sill, B-pillar or other strengthening member, the strengthening member can bend to absorb the energy of the collision.

Conventional strengthening members rely on increasing the thickness and hardness of corner portions to improve crush strength. However, such increased thickness and hardness increases weight and decreases manufacturing feasibility. It may be desirable to provide a strengthening assembly configured to achieve the same or similar strength increase as provided by the thickened corners, while minimizing mass per unit length of the member, and maintaining a high manufacturing feasibility.

It also may be desirable to provide a strengthening member that can achieve increased energy absorption and a more stable axial collapse when forces such as front and side impact forces are exerted on the strengthening member. Additionally, it may be desirable to provide a strengthening member that possesses improved noise-vibration-harshness performance due to work hardening on its corners.

It also may be desirable to provide structures to connect the strengthening member to another automotive component to promote a stable axial crush. When the other automotive component has a different shape than the strengthening member, it may be difficult to apply welding techniques to connect the strengthening member and the other component due to the variation in shape. This difficulty may result in a connection that is not secure and which causes an unstable axial crush.

SUMMARY

In accordance with the various exemplary embodiments, the present disclosure provides a motor vehicle assembly that includes a strengthening member having a twelve-cornered cross section along at least a portion of the strengthening member, and an automotive component having a four-cornered cross section along at least a portion of the automotive component. The cross section of one of the strengthening member and the automotive component transitions between twelve corners and four corners to facilitate a connection between the strengthening member and the automotive component.

In accordance with the various exemplary embodiments, the present disclosure further provides a strengthening member for an automotive vehicle. The strengthening member has a first end having a twelve-cornered cross section including sides and corners creating internal angles and external angles, a second end configured to connect to a four-cornered cross section of another automotive component, and at least one protrusion on each of first and second opposite sides of the strengthening member. The protrusions of the strengthening member are configured to facilitate a stable axial collapse of the strengthening member.

In accordance with the various exemplary embodiments, the present disclosure further provides a strengthening member for an automotive vehicle. The strengthening member has a first portion having a twelve-cornered cross section including sides and corners creating internal angles and external angles, a second portion having a four-cornered cross section configured to connect to a four-cornered cross section of another automotive component, and a tapered portion configured to direct an axial crush of the strengthening member away from the second portion.

Additional objects and advantages will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the invention, as claimed. The accompanying drawings, which are incorporated in and constitute part of this specification, illustrate exemplary embodiments of the invention and together with the description, serve to explain principles of the disclosure.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIGS. 5A-5D illustrate a vehicle front rail without convolutions, having varying cross sections including twelve-cornered cross sections in accordance with the present teachings;

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

The present teachings contemplate providing a strengthening member with a twelve-cornered cross section having a substantially increased stiffness throughout the sides and corners without increasing thickness within the corners. The strengthening member can achieve increased energy absorption and a more stable axial collapse when forces such as front and side impact forces are exerted on the strengthening member. The strengthening member can also possess improved durability and noise-vibration-harshness (NVH) performance due to work hardening on the twelve corners. The degrees of the internal and external angles of the present teachings can achieve the same strength increase as thickened corners, while minimizing mass per unit length of the member and maintaining a high manufacturing feasibility because the member can be formed by bending, rolling, stamping, pressing, hydro-forming, molding, extrusion, cutting, casting, and forging.

Figure 1:
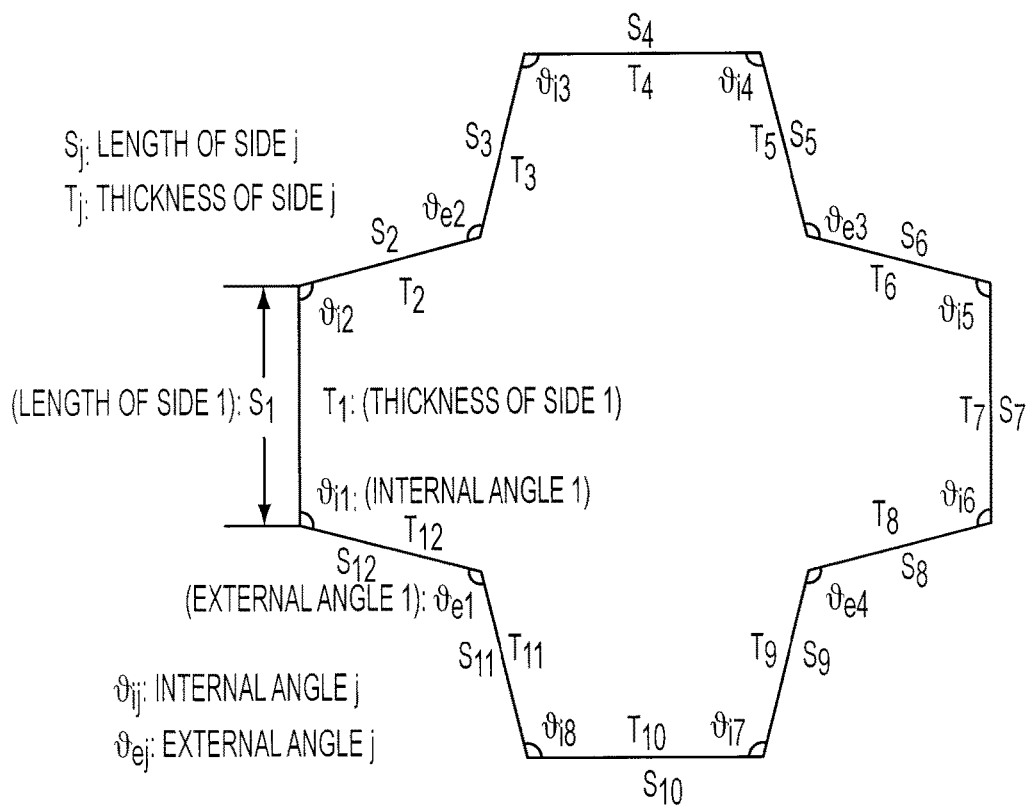
FIG. 1 illustrates an exemplary embodiment of a twelve-cornered cross section for a strengthening member in accordance with the present teachings.

An exemplary embodiment of a twelve-cornered cross section for a strengthening member in accordance with the present teachings is illustrated in FIG. 1. As illustrated, the cross section comprises twelve sides having lengths $S_1$-$S_{12}$ and thicknesses $T_1$-$T_{12}$, eight internal corners with angles $\theta_{i1}$-$\theta_{i8}$ and four external corners with angles $\theta_{e1}$-$\theta_{e4}$. The internal and external angular degrees can be varied to achieve improved strength and other performance features (e.g., stability of folding pattern) compared to existing 90°-angled cross sections. This improved strength obviates the need for increased corner thickness, which is an unexpected and unpredicted benefit of fine-tuning the internal and external angular degrees of a strengthening member having a twelve-sided cross section. In accordance with various embodiments of the present teachings, each internal angle can range from about 100° to about 110°, and each external angle can range from about 105° to about 130°. The lengths $S_1$-$S_{12}$ and thicknesses $T_1$-$T_{12}$ of the sides can be varied to a certain degree, as would be understood by one skilled in the art, for example in accordance with available packaging space within a vehicle. Each internal angle and each external angle of the strengthening member may have an angular degree selected to promote the stable axial crush in accordance with the disclosed range of degrees, while accommodating package constraints of an environment in which the assembly is to be used.

In certain embodiments of the present teachings a thickness of the sides and corners can range from about 0.7 mm to about 6.0 mm. In certain embodiments, the thickness of the sides is substantially the same as the thickness of the corners.

Conventional strengthening members having square or rectangular cross sections are widely used due to their high manufacturing feasibility. Because a strengthening member with a twelve-cornered cross section in accordance with the present teachings has substantially increased strength and stiffness without requiring thicker corner portions, it has a higher manufacturing feasibility than previously-contemplated twelve-cornered members that have thickened 90° corners. While still providing a desired strength, a strengthening member in accordance with the present teachings can be formed in one or multiple sections by, for example, bending, rolling, stamping, pressing, drawing, hydro-forming, molding, extrusion, cutting, casting, and forging. Thus-formed sections can be joined via welding, adhesive, fastening, or other known joining technologies.

In accordance with certain exemplary embodiments of the present teachings, the thickness of the strengthening member may vary, for example, within one side or from side to side to optimize the overall axial crush and bending performance. Examples of such varied thickness embodiments are illustrated in FIGS. 5D and 6D, which are described in detail below.

Figure 2:
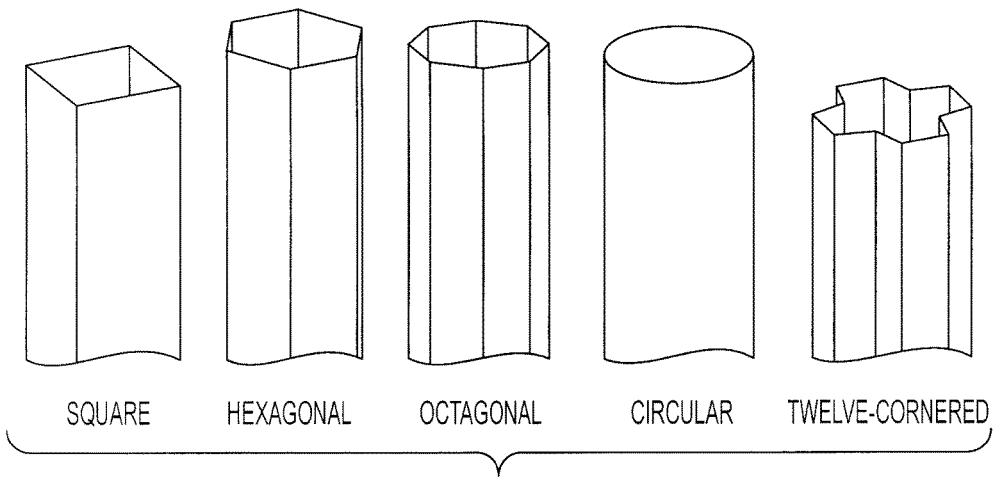
FIG. 2 illustrates strengthening members of varying cross sections having a substantially constant thickness and perimeter.
Figure 3:
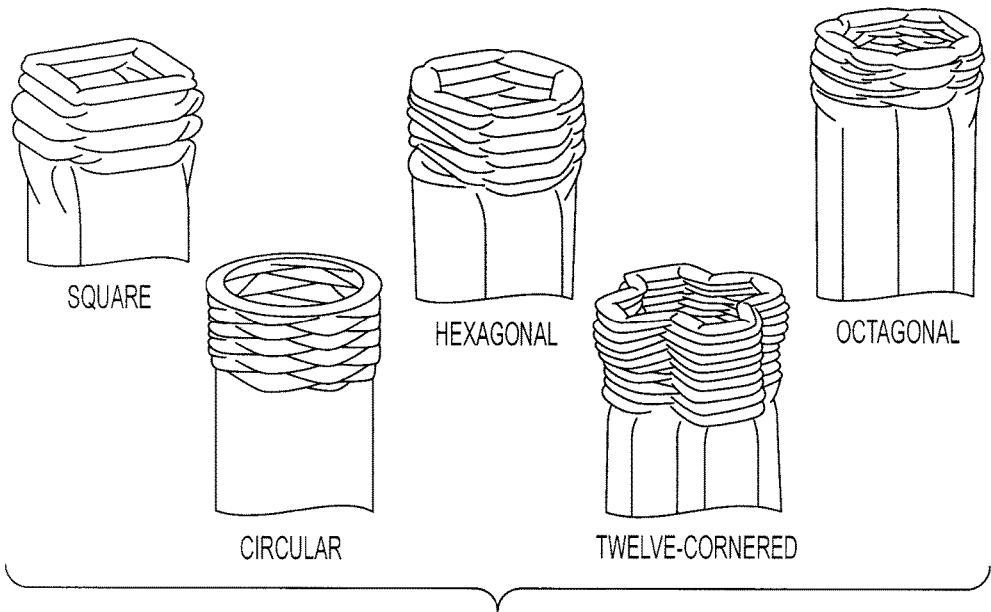
FIG. 3 illustrates an exemplary axial collapse of the strengthening members shown in FIG. 2.

In comparing crash energy absorption of strengthening members of varying shapes having the same thickness and perimeter, as illustrated in FIG. 2, for example for an impact with a rigid wall at 35 mph, a twelve-cornered cross section in accordance with the present teachings demonstrated the shortest crush distance and smallest folding length. The twelve-cornered cross section in accordance with the present teachings also demonstrated the most stable axial collapse and the highest crash energy absorption. In fact, a twelve-cornered cross section in accordance with the present teachings can achieve about a 100% increase in crash energy absorption over a square cross section and a 20-30% increase in crash energy absorption over hexagonal and octagonal cross sections. FIG. 3 illustrates an exemplary axial collapse of the strengthening members shown in FIG. 2. As can be seen, the strengthening member having a twelve-cornered cross section in accordance with the present teachings exhibits the shortest crush distance and most stable folding pattern.

Figure 4:
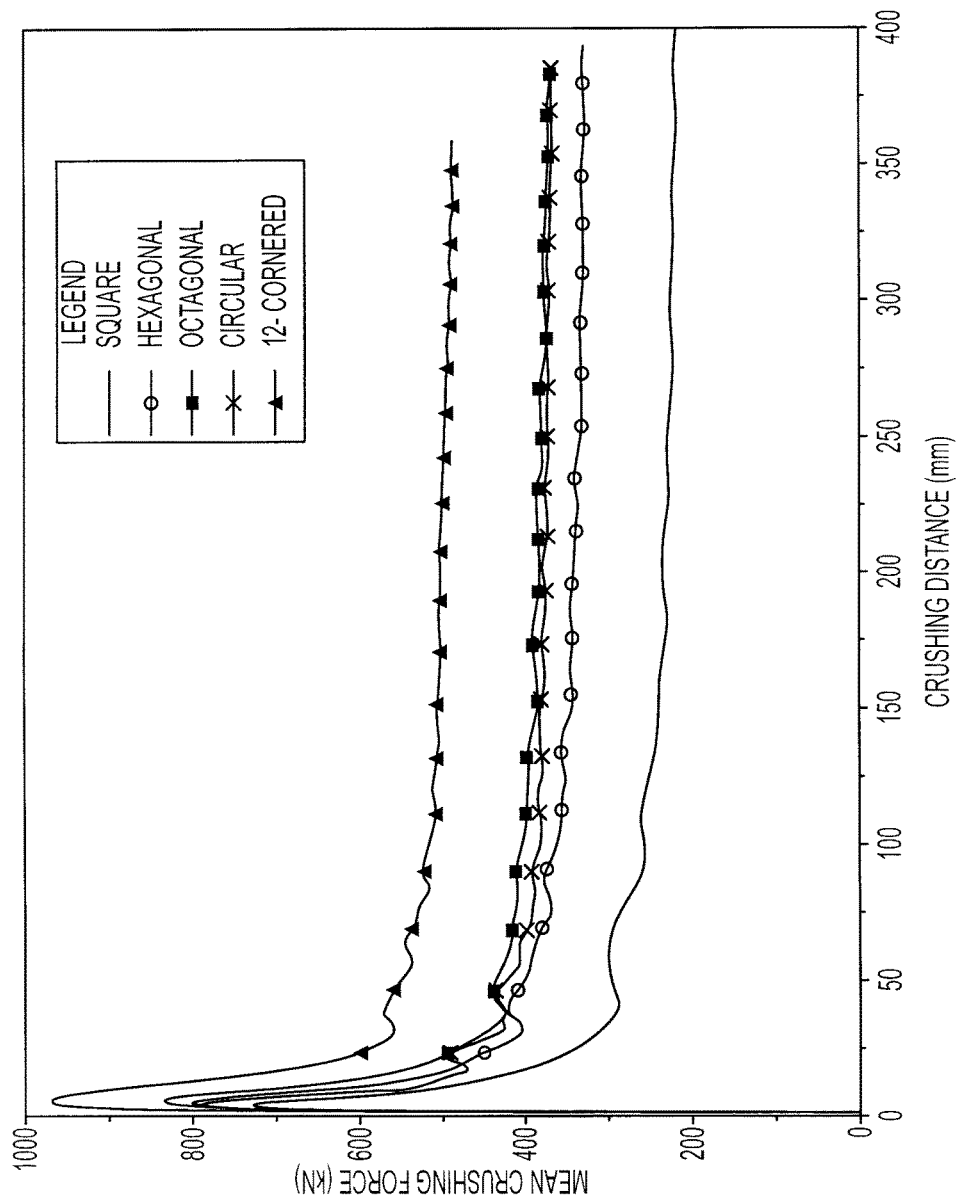
FIG. 4 is a graph of mean crush force and associated axial crush distance for exemplary strengthening members having the cross sections shown in FIG. 2.

FIG. 4 illustrates a graph of mean crush force for an impact with a rigid wall at 35 mph, in kN, exerted axially on exemplary strengthening members having the cross sections shown in FIG. 2. As can be seen, a strengthening member having a twelve-cornered cross section in accordance with the present teachings can sustain a much higher crushing force for a given resulting crushing distance. This allows improved impact energy management while minimizing mass per unit length.

A twelve-cornered cross section in accordance with the present teachings is contemplated for use with a number of structural members such as a front rail, a side rail, a cross member, roof structures, and other components that can benefit from increased crash energy absorption. In addition, the present teachings can be applied to both body-on-frame and unitized vehicles or other type of structures.

FIGS. 5A-5D illustrate exemplary embodiments of a vehicle front rail having a cross section in accordance with the present teachings. The front rail is of a type without convolutions. FIG. 5A illustrates a front rail having a known, substantially rectangular cross section with four corners 510, 512, 514, 516 of about ninety degrees, and four sides 520, 522, 524, 526. FIGS. 5B through 5D illustrate front rails having twelve-cornered cross sections in accordance with the present teachings, the corner indentations I1 in FIG. 5C being greater than the indentations I2 in FIG. 5B. In these illustrated exemplary embodiments, the rails have a two-part construction comprising pieces A and B. The present teachings contemplate rails of other construction such as one-piece or even 3-or-more piece construction, the number of pieces in FIGS. 5A through 5D being exemplary only.

The embodiments of FIGS. 5B and 5C include top and bottom sides $S_B$ and $S_T$ having substantially the same length as each other, and left and right sides $S_L$ and $S_R$ also having substantially the same length as each other. Piece A includes side $S_R$ and part of sides $S_B$ and $S_T$. Piece B includes side $S_L$ and part of sides $S_B$ and $S_T$. To simplify FIGS. 5B-5D, all of the sides $S_1$ through $S_{12}$, as illustrated in FIG. 1, are not labeled but are of course present. Similarly, the eight internal corners (angles: $\theta_{i1}$-$\theta_{i8}$) and four external corners (angles: $\theta_{e1}$-$\theta_{e4}$), as illustrated in FIG. 1, are not labeled but are present.

FIG. 5D illustrates a front rail having a twelve-cornered cross section, the rail being formed with different depths of indentations, for example to accommodate packaging constraints of a vehicle's engine compartment. In accordance with such an embodiment needing to have a varied shape to accommodate engine compartment constraints, to achieve optimized axial crush performance, the thicknesses of the sides, angles of the corners, and indentation depths can all be adjusted to provide optimal strength, size and shape. In the example of FIG. 5D, corner indentations I3 and I4 have the different depths, corner indentation I4 being shallower than corner indentation I3. Corner indentations I5 and I6 have substantially the same depth as each other, that depth differing from the depths of corner indentations I3 and I4. The top and bottom sides $S_B$ and $S_T$ have different lengths, with $S_T$ being longer than $S_B$, and the left and right sides $S_L$ and $S_R$ have differing lengths, with $S_R$ being longer than $S_L$. The internal and external angles $\theta$ may also differ as a result of the differing side lengths and corner indentation depths. The present teachings also contemplate a twelve-cornered cross section where each of the corner indentations has a different depth and a different angle, and each of the sides has a different length, or where some of the sides have the same length and some of the corner indentations have the same depth and perhaps the same internal and external angles $\theta$.

For a front rail comprising SAE1010 material, a front rail as illustrated in FIG. 5B (with shallower indentations) can save, for example, about 17% weight compared to a square or rectangular cross section, and a front rail as illustrated in FIG. 5C (with deeper indentations) can save, for example, about 35% weight. For a front rail comprising DP600 material, a front rail as illustrated in FIG. 5B (with shallower indentations) can save, for example, about 23% weight and a front rail as illustrated in FIG. 5C (with deeper indentations) can save, for example, about 47% weight. Such weight savings are realized because the increased strength of the twelve-cornered cross section allows the use of a thinner gauge material to provide the same strength.

Figure 6B:
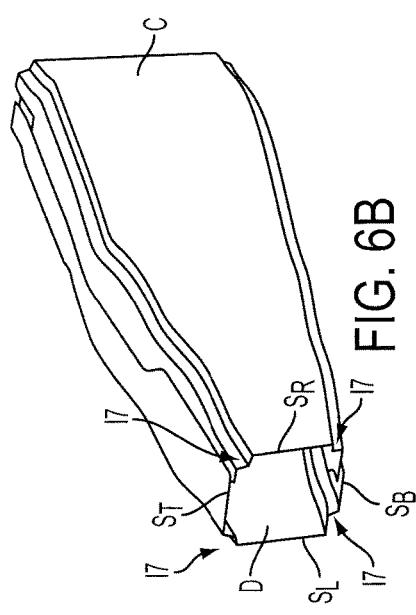
FIGS. 6A-6D illustrate a vehicle front rail with convolutions, having varying cross sections including twelve-cornered cross sections in accordance with the present teachings.
Figure 6D:
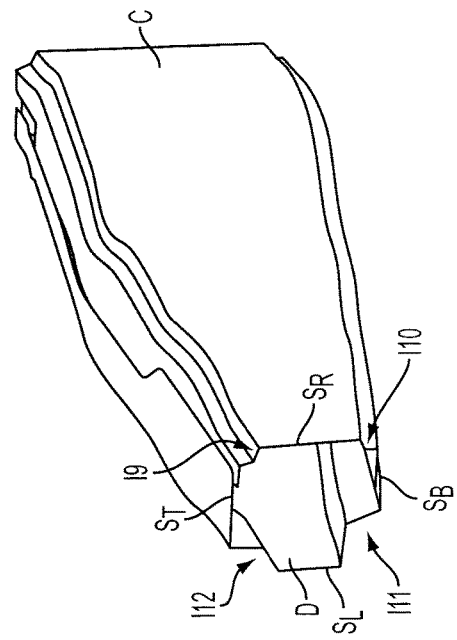
Figure 6A:
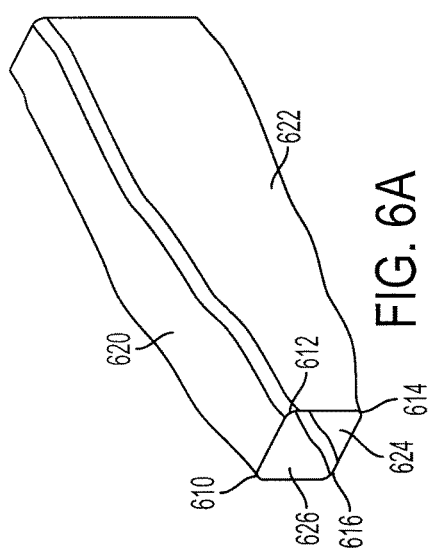
Figure 6C:
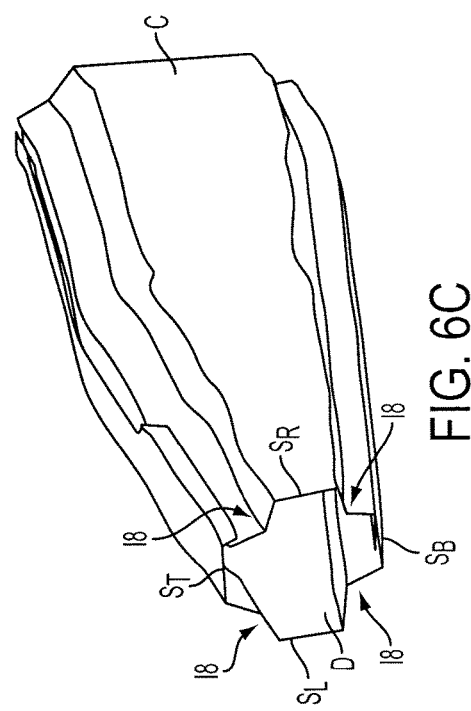

FIGS. 6A-6D illustrate exemplary embodiments of a vehicle front rail having a cross section in accordance with the present teachings. The front rail is of a type with convolutions. FIG. 6A illustrates a convoluted front rail having a known, substantially rectangular cross section with four corners 610, 612, 614, 616 of about ninety degrees, and four sides 620, 622, 624, and 626. FIGS. 6B through 6D illustrate convoluted front rails having twelve-cornered cross sections in accordance with the present teachings, the corner indentations I8 in FIG. 6C being greater than the indentations I7 in FIG. 6B. In these illustrated exemplary embodiments, the rails have a two-part construction with pieces C and D. As stated above, the two-piece constructions shown in FIGS. 6B through 6D are exemplary only and the present teachings contemplate rails of other construction such as one-piece or even 3-or-more piece construction.

The embodiments of FIGS. 6B and 6C include top and bottom sides $S_B$ and $S_T$ having substantially the same length as each other, and left and right sides $S_L$ and $S_R$ also having substantially the same length as each other. Piece C includes side $S_R$ and part of sides $S_B$ and $S_T$. Piece D includes side $S_L$ and part of sides $S_B$ and $S_T$. To simplify FIGS. 6B-6D, all of the sides $S_1$ through $S_{12}$, as illustrated in FIG. 1, are not labeled but are present. Similarly, the eight internal corners (angles: $\theta_{i1}$-$\theta_{i8}$) and four external corners (angles: $\theta_{e1}$-$\theta_{e4}$), as illustrated in FIG. 1, are not labeled but are present.

FIG. 6D illustrates a convoluted front rail having twelve-cornered cross section, the rail being formed with different depths of indentations, for example to accommodate packaging constraints of a vehicle's engine compartment. In accordance with such an embodiment needing to have a varied shape to accommodate engine compartment constraints, to achieve optimized axial crush performance, the thicknesses of the sides, angles of the corners, and indentation depths can all be adjusted to provide optimal strength, size and shape. In the example of FIG. 6D, corner indentations I9 and I10 have the different depths, with corner indentation I10 being shallower than corner indentation I9. Corner indentations I11 and I12 have substantially the same depth as each other, that depth differing from the depths of corner indentations I9 and I10. The top and bottom sides $S_B$ and $S_T$ have different lengths, with $S_T$ being longer than $S_B$, and the left and right sides $S_L$ and $S_R$ have differing lengths, with $S_R$ being longer than $S_L$. The internal and external angles $\theta$ may also differ as a result of the differing side lengths and corner indentation depths. The present teachings also contemplate a twelve-cornered cross section where each of the corner indentations has a different depth and a different angle, and each of the sides has a different length, or where some of the sides have the same length and some of the corner indentations have the same depth and perhaps the same internal and external angles $\theta$.

For a convoluted front rail comprising SAE1010 material, a front rail as illustrated in FIG. 6B (with shallower indentations) can save, for example, about 20% weight compared to a square or rectangular cross section, and a front rail as illustrated in FIG. 6C (with deeper indentations) can save, for example, about 32% weight. For a convoluted front rail comprising DP600 material, a front rail as illustrated in FIG. 6B (with shallower indentations) can save, for example, about 30% weight and a front rail as illustrated in FIG. 6C (with deeper indentations) can save, for example, about 41% weight.

Figure 7:
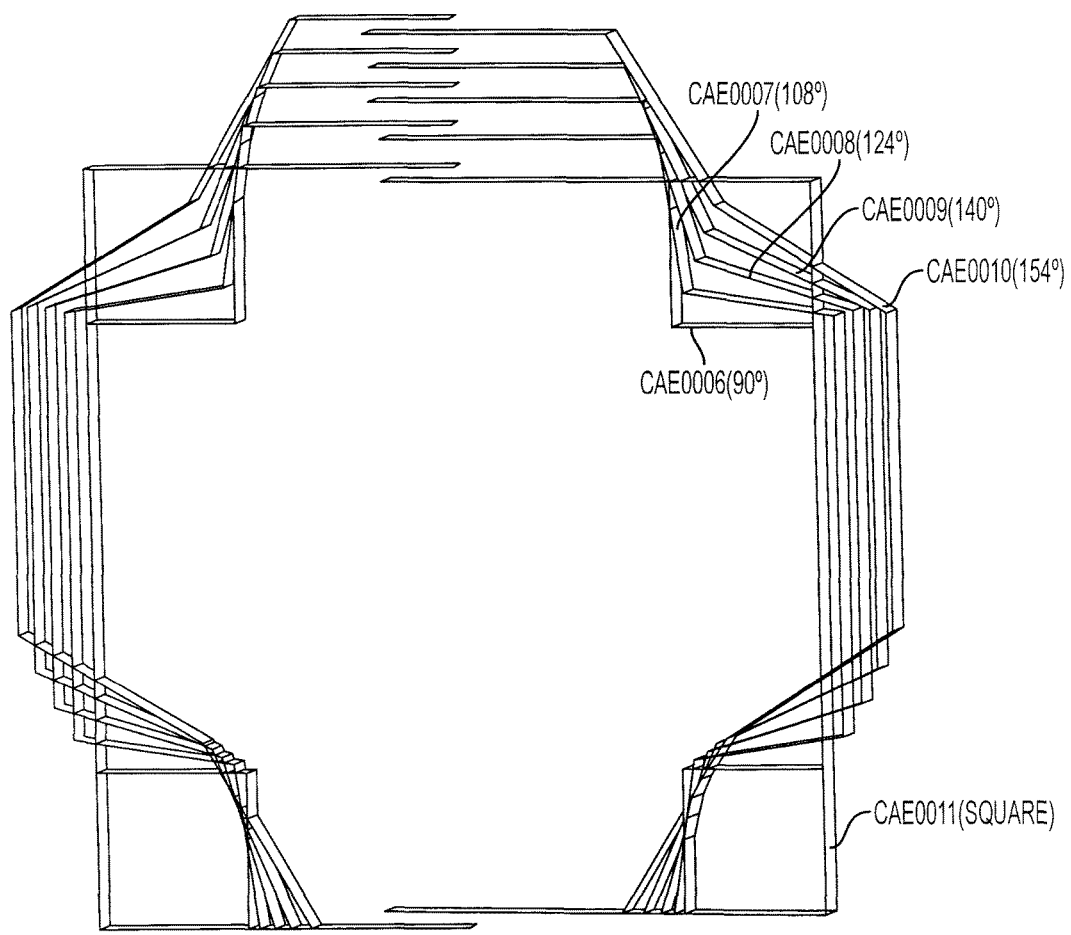
FIG. 7 illustrates geometries of twelve-cornered cross sections of varying shapes and a square cross section having the same thickness and perimeter.
Figure 8:
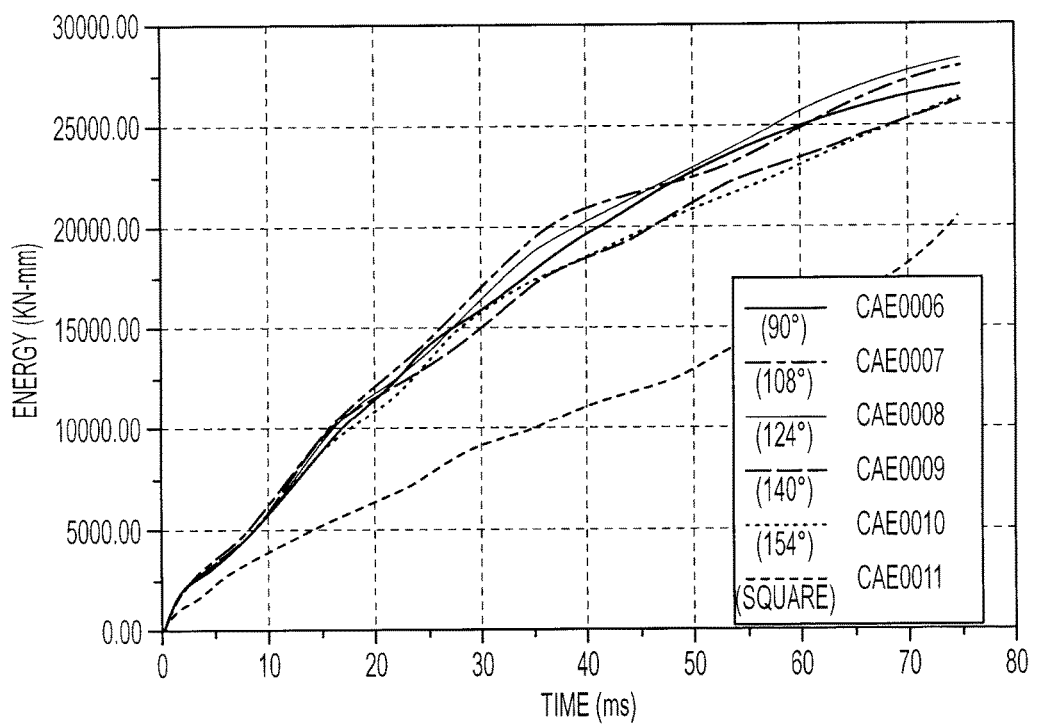
FIG. 8 shows a comparison of crash energy absorbed (for a given force) by strengthening members having the exemplary cross sections illustrated in FIG. 7.

Strengthening members having a variety of cross sections are illustrated in FIG. 7. As can be seen, CAE006 has a twelve-cornered cross section with external angles of 90°. CAE007 has a twelve-cornered cross section with external angles of 108° in accordance with the present teachings. CAE008 has a twelve-cornered cross section with external angles of 124° in accordance with the present teachings. CAE009 has a twelve-cornered cross section with external angles of 140°. CAE010 has a twelve-cornered cross section with external angles of 154°. Finally, CAE011 has a square cross section. A comparison of the axial crush strength of the illustrated square and twelve-cornered cross sections having differing external angles is illustrated in FIG. 8. As can be seen, the overall axial crush strength of the strengthening member having a twelve-cornered cross section is far greater than that of the strengthening member having a square cross section.

As can further be seen, the exemplary strengthening members with twelve-cornered cross sections having external angles of 108° and 124° show an overall increase in axial crush strength over twelve-cornered cross sections having external angles of 90°. In fact, deviation of the angles from 90° such that each internal angle is about the same as other internal angles and ranges from about 100° to about 110°, and each external angle is about the same as other external angles and ranges from about 105° to about 130°, increases strength without negatively affecting the stability of a crush mode of the strengthening member. Such an increase in strength obviates the need for reinforcing (e.g., thickening) the concave portions at the four corners of the strengthening member, decreasing weight and cost and increasing manufacturing feasibility.

Strengthening members in accordance with the present teachings can comprise, for example, steel, aluminum, magnesium, fiberglass, nylon, plastic, a composite or any other suitable materials.

In addition to the structure of the strengthening member, the manner of connection of the strengthening member also plays a role in the ability of the strengthening member to provide a stable axial collapse and high energy absorption under crash conditions. Further, the various exemplary embodiments described herein contemplate strengthening members having a shape to facilitate a stable axial collapse. A strengthening member connected in accordance with the present teachings may provide approximately a 20% increase in amount of energy absorbed versus a direct connection between a twelve-cornered strengthening member and a four-cornered automotive component.

In accordance with certain embodiments, the present teachings contemplate joints between a strengthening member having a twelve-cornered cross section in at least a portion of the strengthening member and an automotive component having a four-cornered cross section in at least a portion of the automotive component. For example, a bridge connection member can be used to join a strengthening member and automotive component to promote a stable axial crush by ensuring a secure connection between the different shapes of the strengthening member and the other automotive component.

In one embodiment, the connection member comprises a transition on one end of the strengthening member from twelve corners to four corners to allow this end to be securely welded to the automotive component. In another embodiment, the bridge connection member comprises a backing plate interposed between the strengthening member and the automotive component. In another embodiment, the bridge connection member comprises at least one bracket connecting the strengthening member and the automotive component.

In further embodiments, slot welds or fish-mouth welds connect the strengthening member and the automotive component. In yet another embodiment, an automotive component transitions at one of its ends from four corners to twelve corners to allow the end to be securely welded to the strengthening member. It is also within the scope of the present teachings to combine any of the embodiments set forth above.

Strengthening members of the various exemplary embodiments described herein may be used a structural member in various locations of a vehicle. For example, the strengthening members may be used as a front rail of a vehicle frame, a side rail of a vehicle frame, a rear rail of a vehicle frame, a cross member of a vehicle frame, a cross member of a vehicle frame outside of the vehicle engine compartment, a door beam, roof structures, or any other structural component of a vehicle that uses a beam structure or strengthening member.

Figure 9A:
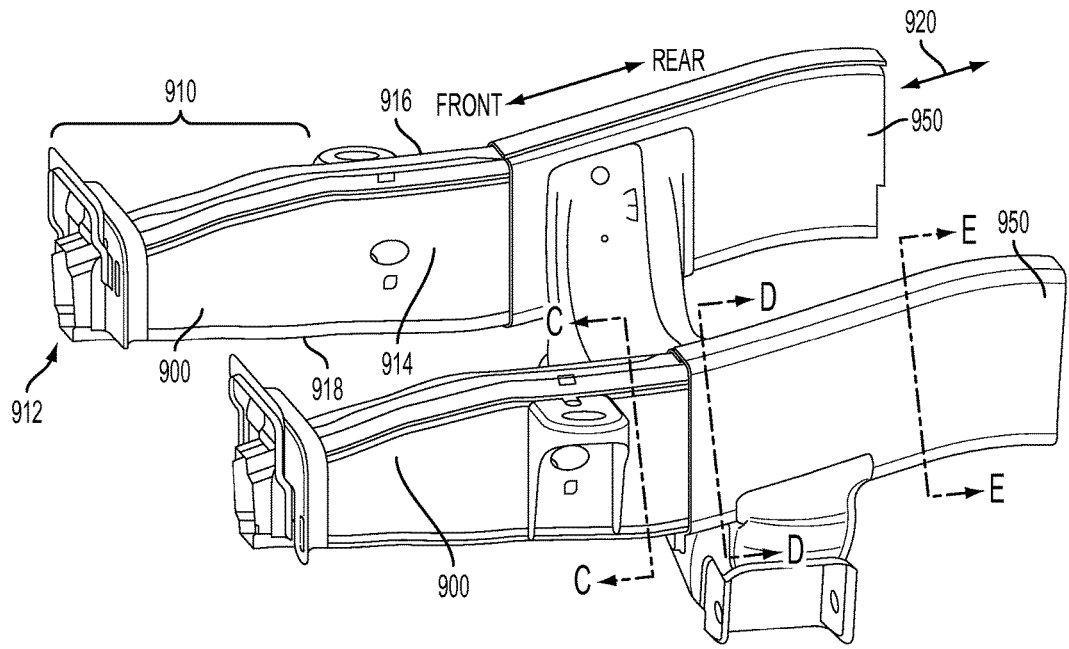
FIG. 9A is a perspective view of a strengthening member having a twelve-cornered cross section directly connected to an automotive component having a four-cornered cross section.
Figure 9B:
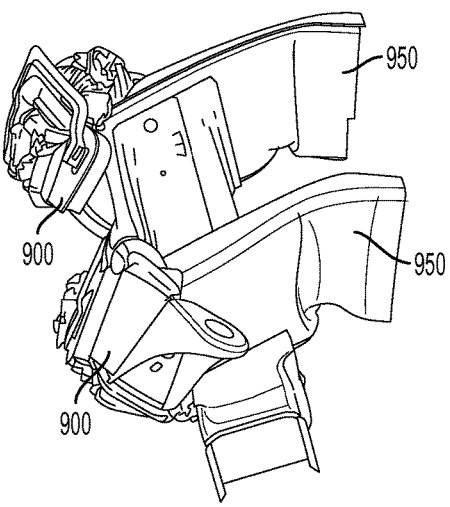
FIG. 9B depicts an unstable axial crush resulting when an axial impact is applied along the longitudinal axis of the structure of FIG. 9A.

FIG. 9A illustrates a strengthening member 900 having a twelve-cornered cross section, in accordance with the present disclosure, connected to an automotive component 950 having a four-cornered cross section. Automotive component 950 may be, for example, a portion of a vehicle frame to which strengthening member 900 is joined. Connections between automotive parts generally include welding each of the corners of the parts to be connected. However, when a strengthening member 900 in accordance with the present disclosure is connected with an automotive component 950 in this manner, it is not possible to apply welds at all corners of the strengthening member, which decreases the stability of the connection. Because the connection is not stable, there is a tendency for the connection itself to be distorted upon application of an impact load. This distortion rotates the strengthening member 900 and prevents the strengthening member 900 from compacting along a longitudinal direction, which results in an unstable axial crush, as shown in FIG. 9B.

Strengthening member 900 may be shaped to facilitate a stable axial crush. According to an exemplary embodiment, strengthening member 900 may include a tapered section 910 that facilitates a stable collapse of strengthening member 900 along an axial direction (e.g., along a longitudinal axis 920) of strengthening member 900. Tapered section 910 may taper so that a cross-sectional area of strengthening member changes along the axial direction (e.g., along longitudinal axis 920) of the strengthening member 900. For example, tapered section 910 may taper so that the cross-sectional area increases in a direction along longitudinal axis 920 from the front to the rear of strengthening member 900, such as when strengthening member 900 is joined to automotive component 950 in the configuration shown in FIG. 9A. According to an exemplary embodiment, tapered section 910 may taper so that the cross-sectional area of tapered section changes in a range of, for example, about 30% to about 70% along the length of tapered section 910 (e.g., along longitudinal axis 920).

According to an exemplary embodiment, a cross-section of a strengthening member is a twelve-cornered cross-section throughout the length of the tapered section.

As depicted in FIG. 9A, tapered section 910 may be shaped so that a top surface 916 of strengthening member 900 is sloped while bottom surface 918 is substantially straight. Further, lateral surfaces 914 of strengthening member may be sloped to form tapered section 910. Other configurations of surfaces 914, 916, 918 are envisioned by the exemplary embodiments described herein in order to provide tapered section 910. For example, top surface 916 may be substantially straight while bottom surface 918 tapers, both top surface 916 and bottom surface 918 may taper, and other configurations may be utilized to form tapered section 910. As shown in FIG. 9A, the portions of surfaces 914, 916, 918 rearward of tapered section 910 may be substantially straight to facilitate joining of strengthening member 900 to automotive component 950

As depicted in the exemplary embodiment of FIG. 9A, tapered section 910 may be located at a front portion 912 of strengthening member 900, with respect to a front-rear direction of a motor vehicle in which strengthening member 900 is installed, such as when automotive component 950 is a front portion of a frame of the motor vehicle. Other configurations of strengthening member 900 relative to automotive component 950 are envisioned by the various exemplary embodiments described herein. For example, strengthening member 900 may be reversed with respect to the front-rear direction of a motor vehicle and located behind automotive component 950 so that tapered section 910 faces the rear of a motor vehicle, such as when automotive component 950 is a rear portion of the frame of the motor vehicle.

Figure 9E:
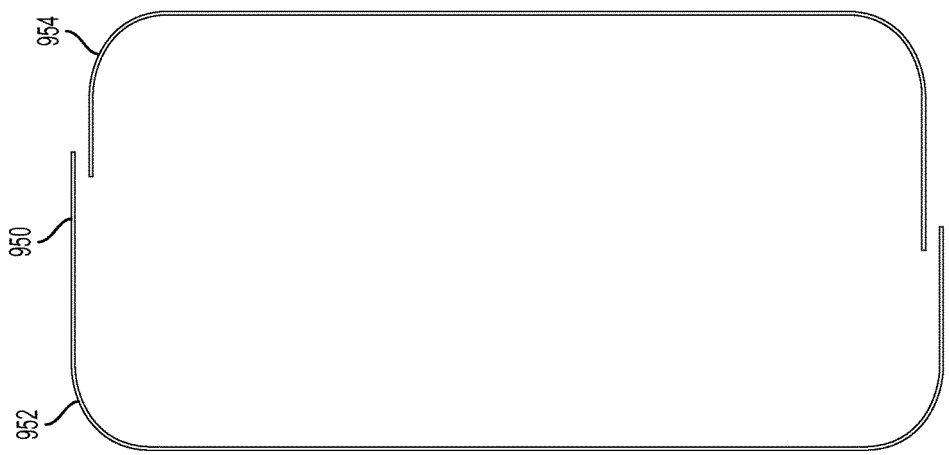
FIG. 9E is a view along the four-cornered cross section taken along the line E-E of FIG. 9A.
Figure 9D:
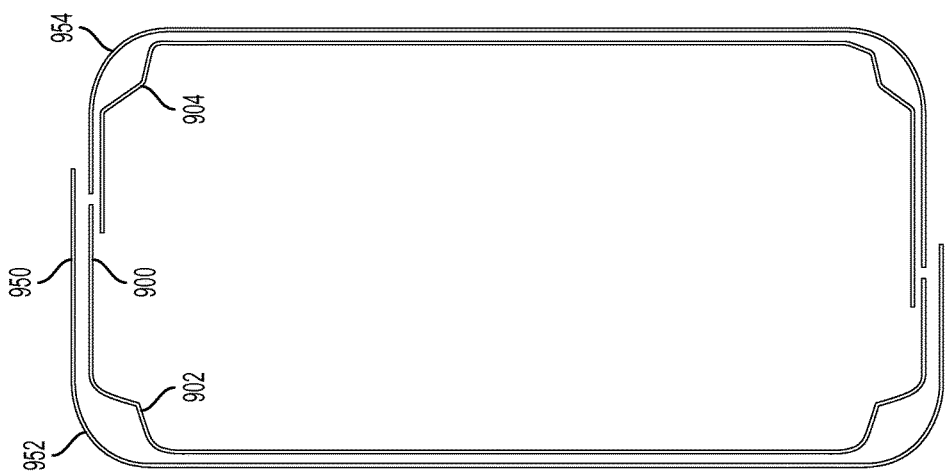
FIG. 9D is a view along the overlap between the twelve-cornered cross section and the four-cornered cross section taken along the line D-D of FIG. 9A.
Figure 9C:
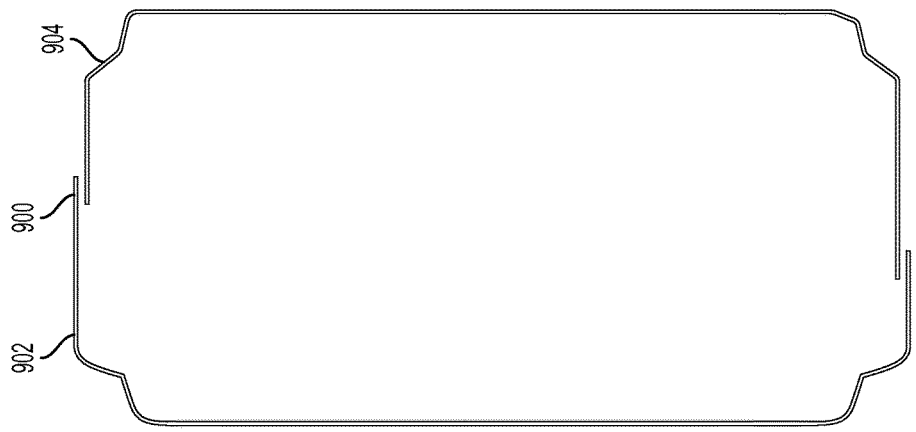
FIG. 9C is a view along the twelve-cornered cross section taken along the line C-C of FIG. 9A.

FIGS. 9C, 9D, and 9E are exemplary embodiments of cross-sectional shapes that may be used for the twelve-cornered cross section of the strengthening member 900 and the four-cornered cross section of the automotive component 950. As depicted in FIG. 9C, strengthening member 900 may have a two-part construction comprising pieces 902 and 904. The present teachings contemplate strengthening members of other constructions, such as one-piece constructions or even 3-or-more piece constructions, the number of pieces in FIGS. 9C through 9E being exemplary only. FIG. 9C resembles the structures illustrated in at least FIGS. 1 and 7 and may have internal angles and external angles according to the various exemplary embodiments described herein. For example, the internal angles of the strengthening member may range from about 100° to about 110°, and the external angles may range from about 105° to about 130°. In this example, the internal angles of corner indentations of the strengthening member 900 are generally depicted as being similar, but it is possible to have different internal angles at each of the corner indentations, as shown in FIGS. 5D and 6D.

FIG. 9D is an exemplary embodiment of an overlapping portion where the strengthening member 900 is inserted into the automotive component 950. As depicted in FIG. 9D, automotive component 950 may have a two-part construction comprising pieces 952 and 954. As shown in the exemplary embodiment of FIG. 9D, the twelve-cornered cross-sectional profile of the strengthening member 900 does not align with the corners of the four-cornered cross-sectional profile of the automotive component 950. While planar edges of the distinct cross sections formed by pieces 902, 904 and 952, 954 are in proximity, the lack of corner alignment prevents welding of the connection between the cross sections at all corners, and thereby leads to instability during crash conditions, as illustrated in FIG. 9B.

FIG. 9E is an exemplary embodiment of a four-cornered automotive component 950, comprising pieces 952 and 954, along the longitudinal axis 920 in FIG. 9A and rearward of the overlapping portion depicted in FIG. 9D. While the corners are shown as having a rounded shape, this particular shape is not intended to limit the claimed subject matter in any way.

In accordance with the present disclosure, a stable connection between a twelve cornered strengthening member and an automotive component having less than twelve corners may be facilitated by a bridge or transitional part or portion of a part such that corners and/or edges of strengthening member and automotive component parts to be connected are aligned in a manner that permits sufficient connection by welding or other means, such as mechanical fasteners like brackets, bolts, and/or nuts. It should be understood that a desired connection can be formed by, for example, modifying one end of the strengthening member to correspond with one end of the automotive component, modifying one end of the automotive component to correspond with one end of the strengthening member, or an intermediate piece such as a bridge plate or bracket may be provided.

Figure 10A:
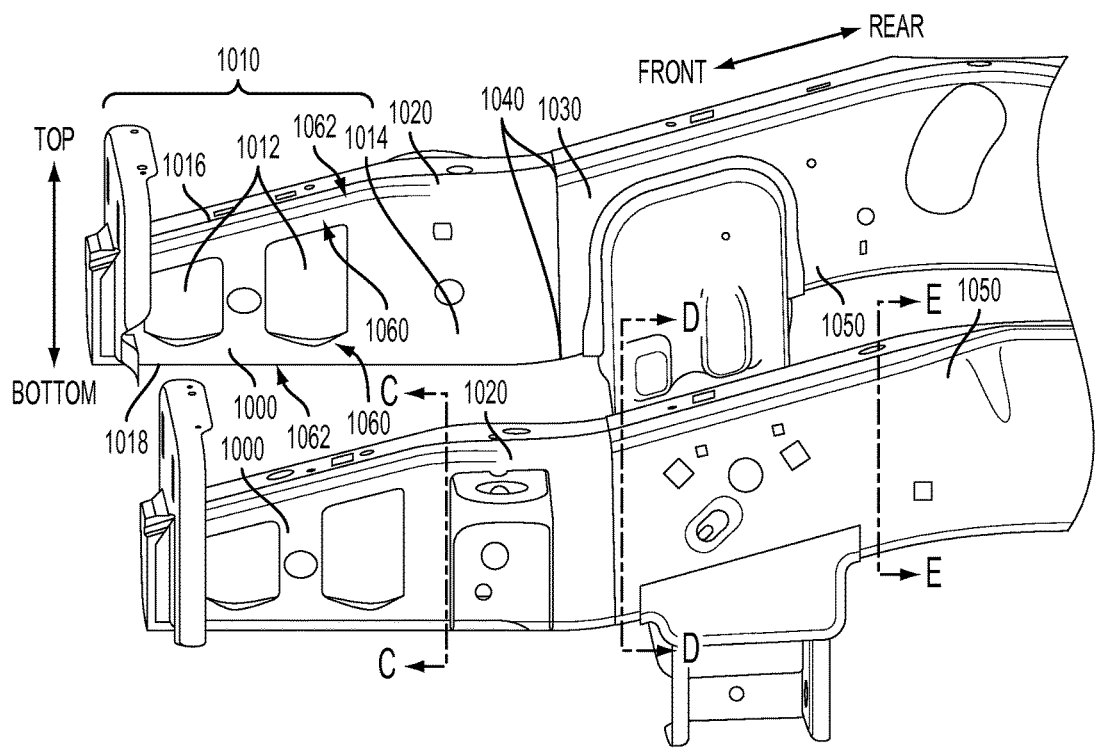
FIG. 10A is a perspective view of a strengthening member that transitions from a twelve-cornered cross section at a first end to a four-cornered cross section having a second end to facilitate connection to an automotive component in accordance with the present teachings.

In accordance with one aspect of the present disclosure and as illustrated in FIG. 10A, an exemplary embodiment of a connection between a twelve-cornered strengthening member 1000 and a four-cornered automotive component 1050 has a transition 1020 at one end of the strengthening member 1000 from twelve corners to four corners. This configuration allows the strengthening member 1000 to be connected directly to the automotive component by an overlapping portion 1030 and welding 1040 at aligned corners or other means of attachment between complementary shapes.

Strengthening member 1000 may include a tapered section 1010 to facilitate a stable axial collapse, as described above with regard to the exemplary embodiment of FIG. 9A. Strengthening member 1000 may include other shapes or structure in addition to, or alternative to, tapered section 1010 to facilitate a stable axial collapse of strengthening member 1000. According to an exemplary embodiment, strengthening member 1000 may include protrusions 1012 to facilitate a stable axial collapse, as will be described below. A strengthening member 1000 may include various numbers of protrusions 1012, such as, for example, one, two, three, four, five, six, seven, eight, or more protrusions 1012. The protrusions 1012 may be located on a lateral surface 1014 of strengthening member and on a surface (not shown) that is an opposite side of strengthening member 1000 to lateral surface 1014. Top 1016 and bottom 1018 surface of strengthening member 1000 may lack protrusions 1012, as depicted in the exemplary embodiment of FIG. 10A, or may include protrusions 1012 to facilitate a stable axial collapse of strengthening member 1000. The protrusions 1012 may be located and spaced relative to one another to promote an axial crush beginning at a portion of the strengthening member 1000 located away from the connection between the twelve-cornered strengthening member 1000 and the four-cornered automotive component 1050, such within tapered section 1010.

Protrusions may be configured to have a predetermined shape that facilitates a stable axial collapse of strengthening member. For example, protrusions 1012 may be provided with an undulating or wave-like shape that is more likely to compress along an axial direction, such as in a manner similar to the compression of an accordion. Disposing protrusions 1012 and tapered section 1010 at locations away from the connection between the strengthening member 1000 and automotive component 1050 enables a single strengthening member 1000 to be used in various motor vehicles of differing weights. By way of example, if a strengthening member 1000 provides too much resistance to compression, a vehicle having a lower weight may not be able to axially crush the strengthening member 1000 in a stable manner, and so impact energy may be more likely to be transmitted into the automotive component 1050, and thereby into the rest of the vehicle.

Protrusions 1012 may have various configurations to facilitate a stable axial collapse of a strengthening member. According to an exemplary embodiment, a protrusion 1012 may extend along only a portion of a surface of a strengthening member 1010, such as along the front-rear and top-bottom directions depicted in FIG. 10A. For example, protrusions 1012 may extend along a portion of lateral surface 1014 along the top-bottom direction in FIG. 10A so that flat portions 1060 of lateral surface 1014 are present between protrusions 1012 and corners 1062 forming top and bottom edges of lateral surface 1014. According to an exemplary embodiment, protrusions 1012 may extend along a top-bottom direction of a surface over an extent of, for example, about 30% to about 60% of the length of the surface along the top-bottom direction. Further, a protrusion 1012 may extend from lateral surface 1014 to increase the width of strengthening member 1000 (in a direction transverse to the front-rear direction) by an amount of, for example, about 5% to about 10%, such as at a center of a protrusion 1012.

Protrusions of the various exemplary embodiments described herein may have an increased strength in comparison to other portions of a strengthening member (e.g., portions of a strengthening member where a protrusion is not present). The increased strength of a protrusion may be due to the material strength and/or the structural geometry of the protrusion. For example, the material of a protrusion may be work hardened during the manufacturing operation that forms the protrusion in a strengthening member, resulting in the protrusion having a higher strength than other portions of the strengthening member. As a result, the protrusion a stable axial collapse of a strengthening member.

The protrusions 1012 and the tapered section 1010 may help ensure that an axial crush begins away from the connection between the strengthening member 1000 and automotive component 1050 and the crush continues as the cross section, and corresponding impact energy absorption, of the strengthening member 1000 increases, such as towards a rear portion of the strengthening member 1000. Because vehicles may vary in configurations and differ in weight, it may be desirable to provide a strengthening member 1000 that is configured to promote a stable axial crush along the strengthening member 1000 from an area having smaller resistance (e.g., a front portion of tapered section 1010) to compression to an area having a larger resistance to compression (e.g., a rear portion of strengthening member 1000, such as where strengthening member 1000 connects to automotive component 1050).

By configuring a strengthening member according to the various exemplary embodiments described herein, a strengthening member is provided that absorbs energy during a crash and can be efficiently used in various motor vehicles. According to an exemplary embodiment, the strengthening members may be designed to accommodate varying amounts of crush force, such as less crush force for smaller vehicles and greater crush force for larger vehicles. For example, the strengthening members of the embodiments described with respect to FIGS. 9A-19 have a mean crush force, exerted axially, for an impact with a rigid wall at 35 mph of about 100 kN to about 300 kN at a crush distance of about 400 mm. In another example, a strengthening member has a mean crush force, exerted axially, for an impact with a rigid wall at 35 mph of about 100 kN to about 200 kN at a crush distance of about 150 mm. In another example, a strengthening member has a mean crush force for an impact with a rigid wall at 35 mph, exerted axially, of about 200 kN to about 300 kN at a crush distance of about 400 mm.

Figure 10B:
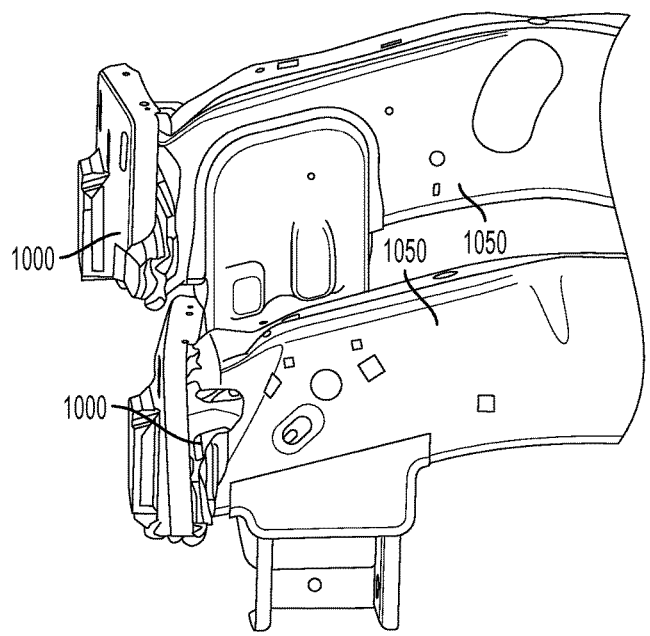
FIG. 10B depicts a stable axial crush resulting when an axial impact is applied along the longitudinal axis of FIG. 10A.
Figure 19:
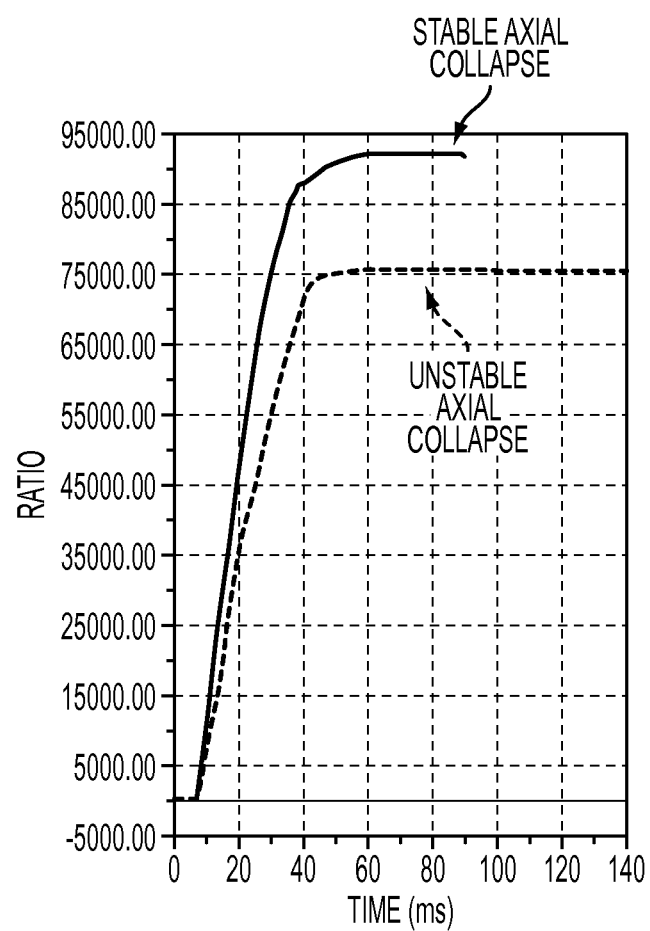
FIG. 19 depicts test results for energy absorption for strengthening members undergoing a stable axial collapse and an unstable axial collapse, according to an exemplary embodiment.

The shape of the portion of the strengthening member that connects to an automotive component may be designed to facilitate connection between the strengthening member and the automotive component, such as when the strengthening member and automotive component differ in cross-sectional shapes. For example, the shape at the end of transition 1020, which transitions the cross-section of strengthening member 1000 from twelve corners to four corners, may be substantially complementary to the shape of the automotive component 1050. In this manner, the strengthening member 1000 may be inserted into the automotive component 1050, or vice versa, at overlapping portion 1030, and all of the corners and sides of strengthening member 1000 and automotive component 1050 may align for welding (e.g., at weld locations 1040) in order to securely connect the strengthening member 1000 to the automotive component 1050. This secure connection facilitates a stable axial collapse, as shown in FIG. 10B. A stable axial collapse (e.g., FIG. 10B) provides additional energy absorption in comparison to an unstable axial collapse (e.g., FIG. 9B). For example, the exemplary embodiment of FIG. 19 depicts energy absorption test results for a stable axial collapse and an unstable axial collapse, with the stable axial collapse exhibiting a 20% greater amount of energy absorption. Further, the connection between strengthening member 900 and automotive component 950 reduces the need for additional intermediate connection structures, thereby reducing the overall weight and cost of the system. In addition, the use of fewer parts may provide a stable connection and a resulting stable axial crush while optimizing manufacturing feasibility.

Figure 10E:
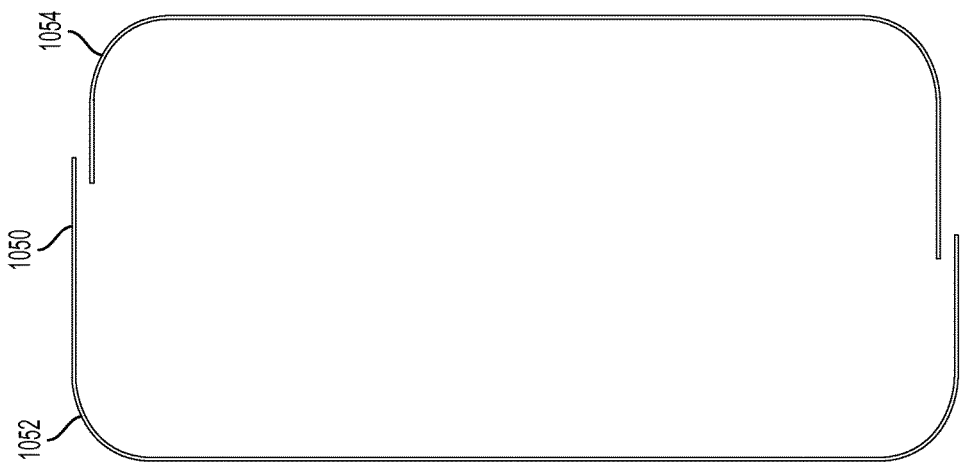
FIG. 10E is a view along the four-cornered cross section of the automotive component taken along the line E-E of FIG. 10A.
Figure 10D:
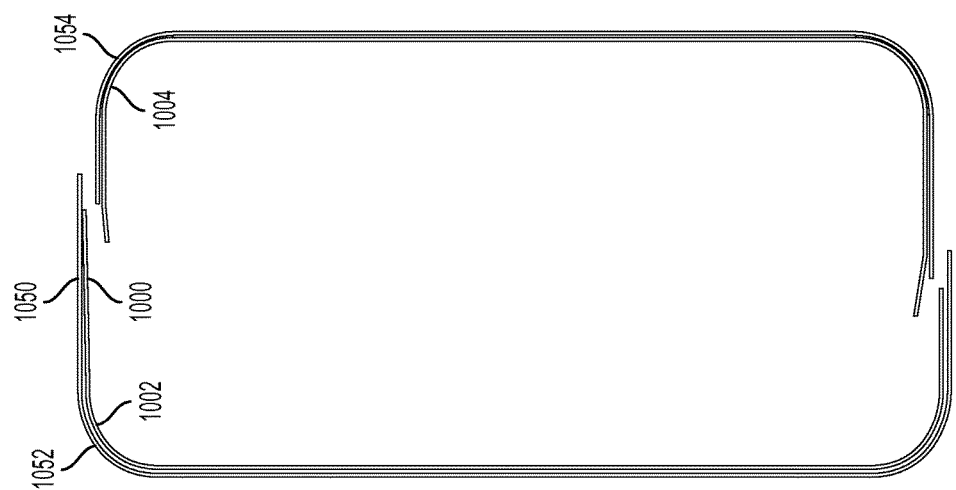
FIG. 10D is a view along the overlap between the four-cornered cross section of the strengthening member after the transition and a four-cornered cross section of the automotive component taken along line D-D of FIG. 10A.
Figure 10C:
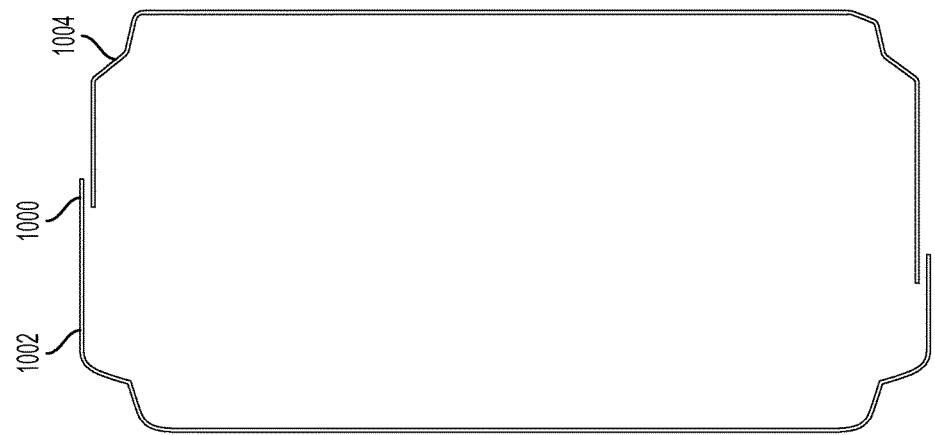
FIG. 10C is a view along the twelve-cornered cross section of the strengthening member taken along the line C-C of FIG. 10A.

FIGS. 10C, 10D, and 10E are exemplary embodiments of cross-sectional shapes that may be used for the twelve-cornered cross section of the strengthening member 1000, the overlapping portion 1030, and the four-cornered cross section of the automotive component 1050 in FIG. 10A. In FIG. 10C, the portion of the strengthening member 1000 before the transition 1020 (e.g., forward of transition 1020 along the front-rear direction shown in FIG. 10A) has a cross section similar to the cross section which is illustrated in FIG. 9C. As depicted in FIG. 10C, strengthening member 1000 and automotive component 1050 may have two-part constructions respectively comprising pieces 1002, 1004 and 1052, 1054, or may have other constructions, as described above with regard to FIG. 9C. Further, FIG. 10C resembles the structures illustrated in at least FIGS. 1 and 7 and may have internal angles and external angles according to the various exemplary embodiments described herein.

FIG. 10D is an exemplary embodiment of an overlapping portion where the strengthening member 1000 is inserted into the automotive component 1050. As shown in the exemplary embodiment of FIG. 10D, the shape of the strengthening member 1000 after the transition 1020 (e.g., rearward of transition 1020 along the front-rear direction in FIG. 10A) is substantially complementary to the four-cornered shape of the automotive component 1050. In other words, the cross-sectional shape of strengthening member 1000 transitions from the shape shown in FIG. 10C to the shape depicted in FIG. 10 in order to be complementary to the cross-sectional shape of automotive component 1050. The particular shapes and angles are not intended to limit the scope of the disclosure, and merely represent an exemplary embodiment for transitional cross-sections between a twelve-cornered cross section and a four-cornered cross section.

An amount of overlap 1030 between the strengthening member 1000 and the automotive component 1050 may depend on various factors, such as, for example, dimensions of the strengthening member 1000 and automotive component 1050, the type of weld used, or if the strengthening member 1000 is inserted within the automotive component 1050 or vice versa. For the exemplary embodiment of FIG. 10A, there may be an overlap 1030 of, for example, approximately 15 mm to approximately 25 mm for flat weld joint. A transition 1020 of the strengthening member 1000 from twelve corners to four corners may be located forward of (e.g., adjacent to) the overlapping portion 1030 along the front-rear direction depicted in FIG. 10A.

FIG. 10E is an exemplary embodiment of a four-cornered automotive component 1050 rearward of the overlapping portion 1030. While the corners are shown as having a rounded shape, this particular shape is not intended to limit the claimed subject matter in any way.

Figure 11A:
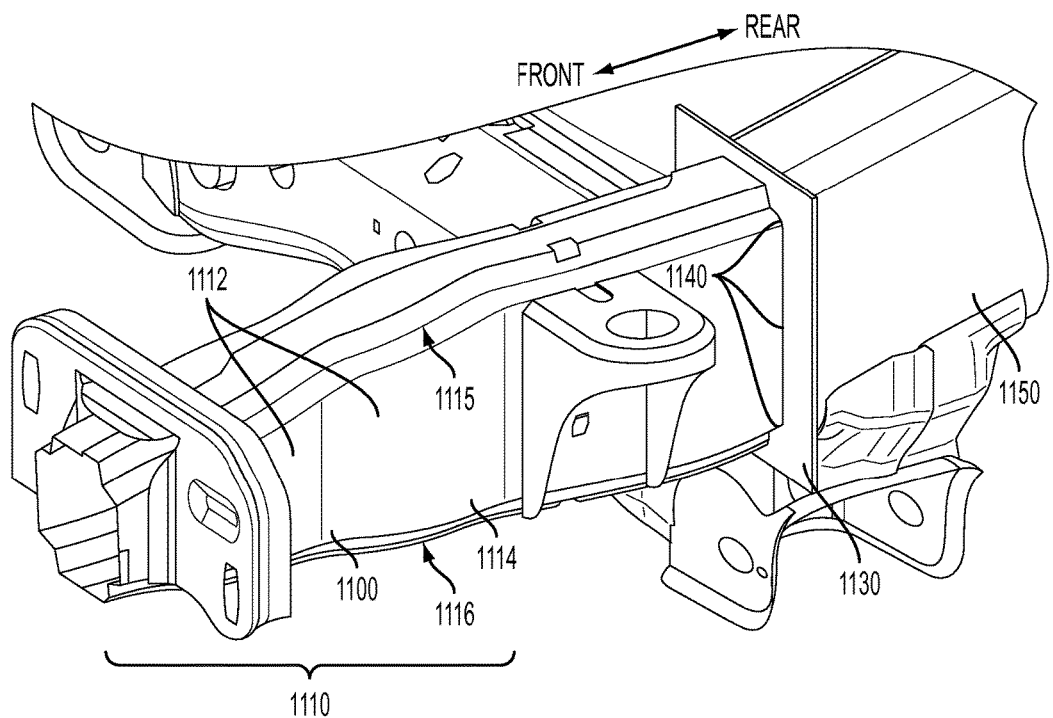
FIG. 11A is a perspective view of an embodiment of a connection between a strengthening member having a twelve-cornered cross section and an automotive component having a four-cornered cross section in accordance with the present teachings.

FIG. 11A is a view of another exemplary embodiment of a connection between a twelve-cornered strengthening member 1100 and a four-cornered automotive component 1150. As with FIG. 10A, the strengthening member 1100 may include a tapered section 1110 and/or protrusions 1112, as described above. Protrusions 1112 may be configured as described above with regard to FIG. 10A or may have different shapes. For example, protrusions 1112 may extend from a top to bottom of lateral side 1114 (e.g., from corner 115 to corner 1116 on lateral side 1114), as depicted in the exemplary embodiment of FIG. 11A.

Figure 11B:
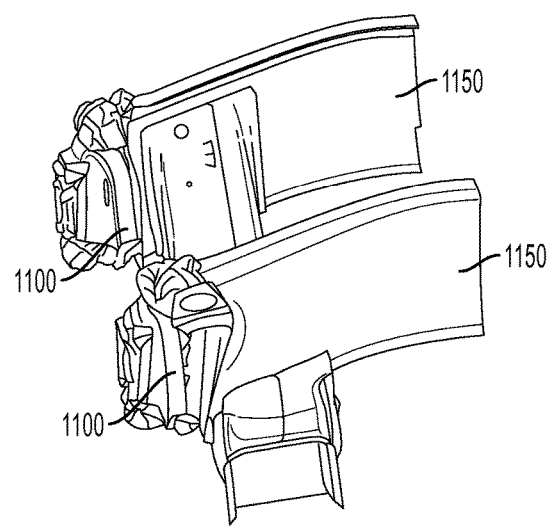
FIG. 11B depicts a stable axial crush resulting when an axial impact is applied along the longitudinal axis of the strengthening member of FIG. 11A.

In FIG. 11A, the connection between the strengthening member 1100 and the automotive component 1150 comprises a backing plate 1130 interposed between the strengthening member 1100 and the automotive component 1150. Backing plate 1130 may therefore serve as a transition or bridge between strengthening member 1100 and automotive component 1150. This configuration facilitates connection of the strengthening member 1100 to the automotive component 1150 via the backing plate 1130. For example, backing plate 1130 may be respectively connected to strengthening member 1100 and automotive component 1150, such as via welds 1140 at the respective ends of the strengthening member 1100 and automotive component 1150, such as along the corners and sides of each connected element. In another example, the backing plate 1130 is bolted to the automotive component 1150 (e.g., bolted to a flange (not shown) of the automotive component 1150) or attached by any other known means, such as via other fastening means. This secure connection between the strengthening member 1100, backing plate 1130, and automotive component 1150 facilitates a stable axial crush, as shown in FIG. 11B. The backing plate 1130 can be formed as one plate or two plates respectively joined to strengthening member 1100 and automotive component 1150 and connected to one another. In an exemplary embodiment where the backing plate 1130 is formed as one plate, both strengthening member 1100 and automotive component 1150 may be welded to the same backing plate 1130. In an exemplary embodiment where the backing plate 1130 is formed as two plates, strengthening member 1100 and automotive component 1150 may be welded to separate plates, and the separate plates may be bolted together or joined via other means known in the art.

As depicted in the exemplary embodiment of FIG. 11A, strengthening member 1100 may have a twelve-cornered cross-section from the front to the rear of the strengthening member 1100. Therefore, backing plate 1130 may facilitate joining strengthening member 1100 to automotive component 1150, such as when automotive component 1150 has a four-cornered cross-section. Other configurations may be utilized for strengthening member 1100, such as a cross-section that transitions from a twelve-cornered cross-section to a four-cornered cross-section, as described above in regard to FIG. 10A.

Figure 12A:
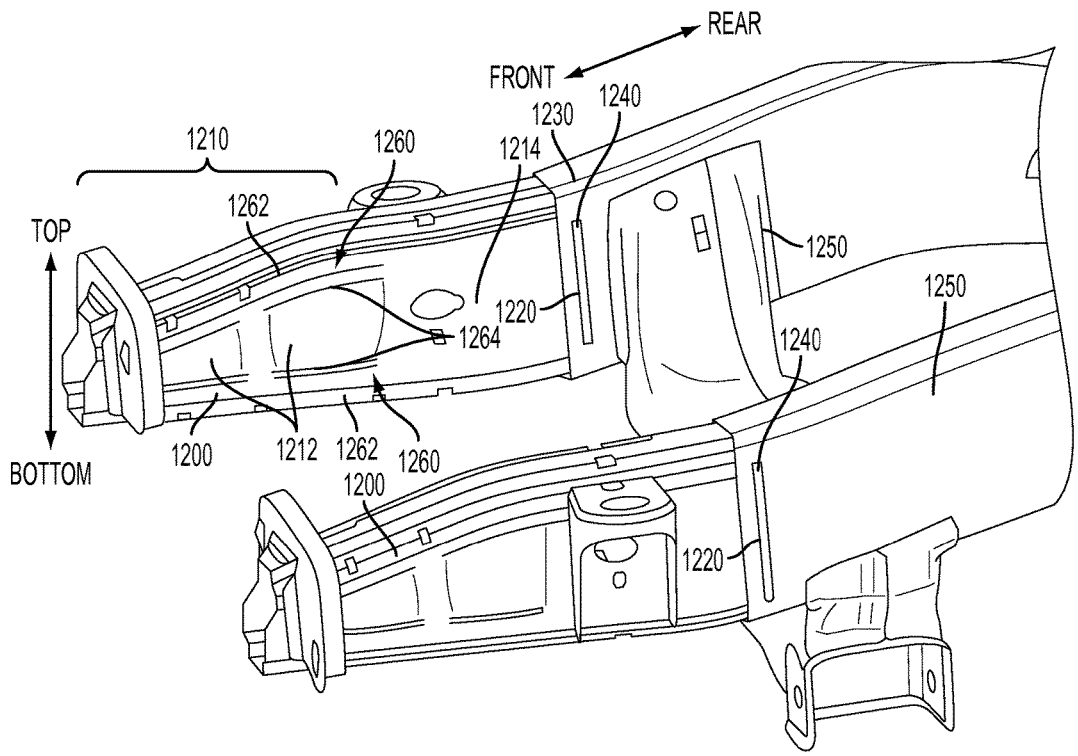
FIG. 12A is a perspective view of a second embodiment of a connection between a strengthening member having a twelve-cornered cross section and an automotive component having a four-cornered cross section in accordance with the present teachings.

FIG. 12A is another exemplary embodiment of a connection between a twelve-cornered strengthening member 1200 and a four-cornered automotive component 1250. Strengthening member 1200 may include a tapered section 1210, as described above with regard to the exemplary embodiment of FIG. 9A. The strengthening member 1200 may include protrusions 1212 as described above. For example, protrusions 1212 may extend along a portion of a surface, such as lateral surface 1214, along a top-bottom direction in FIG. 12A. For instance, flat portions 1260 may be provided between protrusions 1212 and top and bottom edges of surface 1214 that are formed by corners 1260 of strengthening member 1200. Further, although protrusions 1212 may be formed by curved surfaces, as depicted in FIGS. 9A and 10A, protrusions 1212 may be formed by various angled surfaces that form corners 1264, as depicted in FIG. 12A.

Figure 12B:
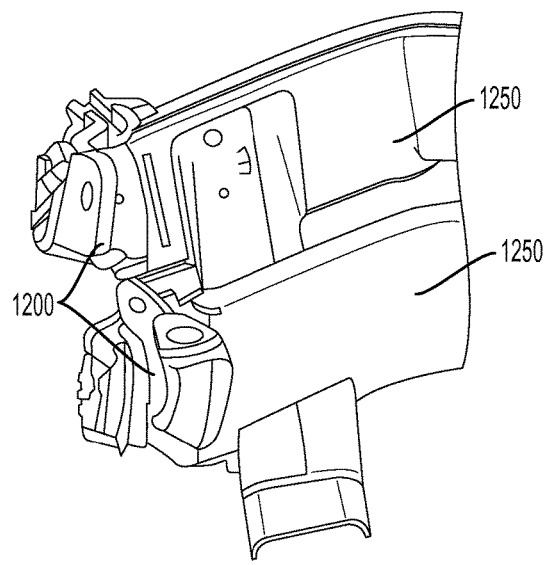
FIG. 12B depicts a stable axial crush resulting when an axial impact is applied along the longitudinal axis of the strengthening member of FIG. 12A.

According to an exemplary embodiment, at least one of the strengthening member and the automotive component may include one or more cutouts to facilitate welding the strengthening member and automotive component to one another. For example, in FIG. 12A, the connection comprises slot welds in the sides of the automotive component 1250 within the overlapping portion 1230 between strengthening member 1200 and automotive component 1250. Cutouts can be provided in at least one of the strengthening member 1200 and the automotive component 1250 to facilitate the welding, such as by providing one or more slots 1220 around a circumference of the automotive component 1250. As a result, when the strengthening member 1200 is inserted into the automotive component 1250, additional surface area of the strengthening member 1200 may be welded at location(s) 1240 at the slot(s) 1220 and portions of the strengthening member 1200 and automotive component 1250 to be joined may be more accessible during welding. This configuration may also be reversed such that the slots are formed in the strengthening member 1200 and the automotive component 1250 is inserted into the strengthening member 1200. This secure connection facilitates a stable axial crush, as shown in FIG. 12B.

According to an exemplary embodiment, slots 1220 and welds 1240 may be discrete and extend along portions of surfaces of strengthening member 1200 and automotive component 1250. For example, slots 1220 and welds 1240 may extend along a portion of surfaces of strengthening member 1200 and automotive component 1250 between corners 1260 of strengthening member 1200 because corresponding surfaces of strengthening member 1200 and automotive component 1250 are in contact or close proximity to one another at those locations, in comparison to corners 1260 because of the difference in cross-sectional shapes of strengthening member 1200 and automotive component 1250. As a result, slots 1220 and welds 1240 facilitate joining strengthening member 1200 and automotive component 1250 when they have differing cross-sections, such as when strengthening member 1200 has a twelve-cornered cross-section and automotive component 1250 has a four-cornered cross-section, as depicted in the exemplary embodiment of FIG. 12A. Other configurations are envisioned for strengthening member 1200 and automotive component, such as a cross-section for strengthening member 1200 that transitions from a twelve-cornered cross-section to a four-cornered cross-section, as described above in regard to FIG. 10A.

Figure 13A:
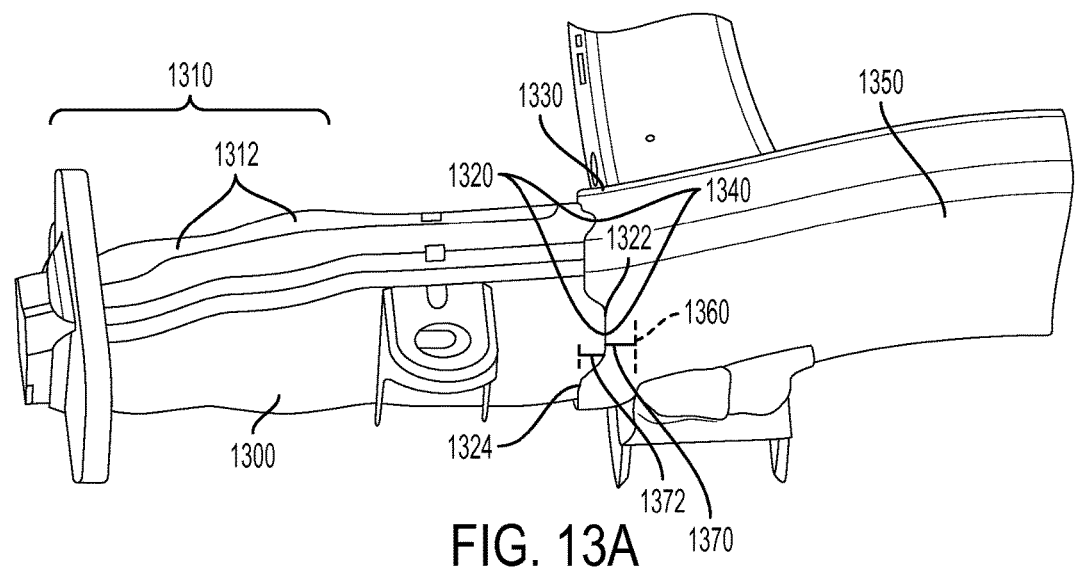
FIG. 13A is a perspective view of a third embodiment of a connection between a strengthening member having a twelve-cornered cross section and an automotive component having a four-cornered cross section in accordance with the present teachings.

FIG. 13A is a view of another exemplary embodiment of a connection between a twelve-cornered strengthening member 1300 and a four-cornered automotive component 1350. Strengthening member 1300 may include a tapered section 1310 and/or protrusions 1312, as discussed in the exemplary embodiments herein. In FIG. 13A, the connection includes one or more fish-mouth weld joints, which may include removal of material at a connected end of the automotive component 1350 to form cutouts 1320 having a fish-mouth shape, insertion of the strengthening member 1300 into the fish-mouth shaped cutouts 1320 to create an overlapping portion 1330, and welding at locations 1340 along the increased surface area of the strengthening member 1300 exposed by the fish-mouth shape.

According to an exemplary embodiment, fish-mouth shaped cutouts 1320 and welds 1340 may be discrete and extend along portions of strengthening member 1300 and automotive component 1350. As a result, fish-mouth shaped cutouts 1320 and welds 1340 facilitate joining strengthening member 1300 and automotive component 1350 when they have differing cross-sections, as discussed above with regard to the exemplary embodiment of FIG. 12A. Other configurations are envisioned for strengthening member 1300 and automotive component, such as a cross-section for strengthening member 1300 that transitions from a twelve-cornered cross-section to a four-cornered cross-section, as described above in regard to FIG. 10A.

Figure 13B:
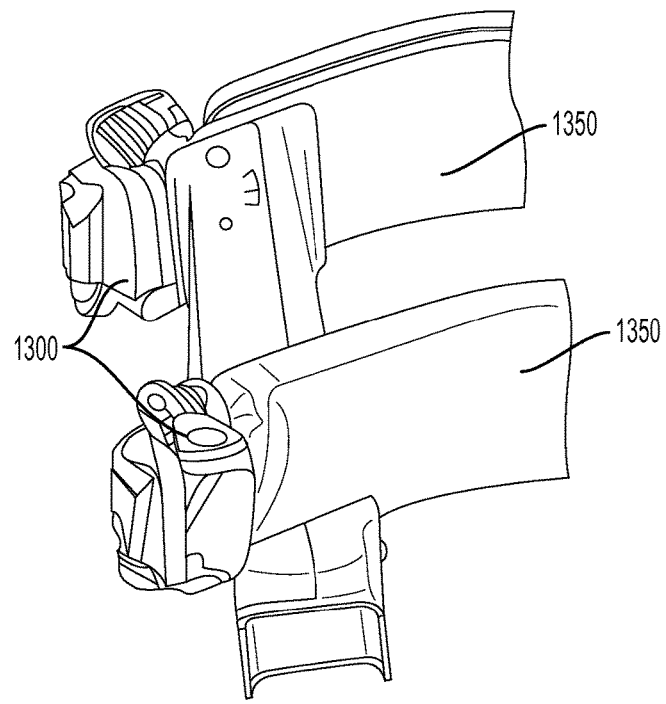
FIG. 13B depicts a stable axial crush resulting when an axial impact is applied along the longitudinal axis of the strengthening member of FIG. 13A.

While FIG. 13A shows the strengthening member 1300 inserted into the automotive component 1350, this configuration may also be reversed such that the material is removed from an end of the strengthening member and the automotive component is inserted into the strengthening member. This secure connection facilitates a stable axial crush, as shown in FIG. 13B. In the exemplary embodiment of FIG. 13A, it may be desirable to provide an overlapping portion 1330 with an approximately 10 mm inner overlap (e.g., a distance 1370 between a rear edge 1360 of strengthening member 1300, depicted via a dashed line in FIG. 13A, and a rear edge 1322 of fish-mouth shaped cutout 1320) and 10 mm outer overlap (e.g., a distance 1372 between a front edge 1324 of fish-mouth shaped cutout 1320 and the rear edge 1322 of the fish-mouth shaped cutout 1320) to secure the fish-mouth weld joint. Thus, a total overlap between strengthening member 1300 and automotive component 1350 may include both the inner overlap (e.g., distance 1370) and the outer overlap (e.g., distance 1372).

Figure 14A:
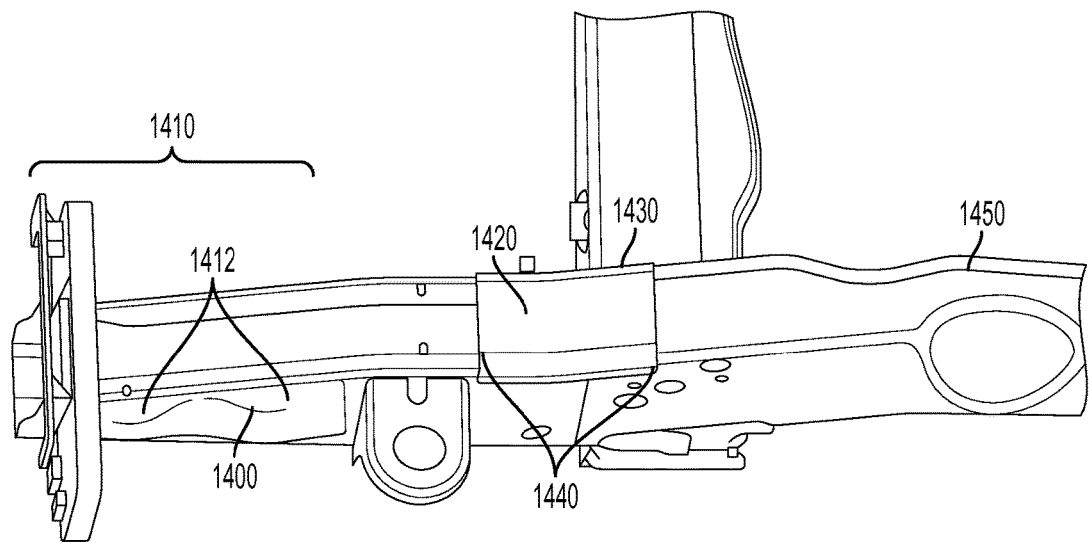
FIG. 14A is a perspective view of a fourth embodiment of a connection between a strengthening member having a twelve-cornered cross section and an automotive component having a four-cornered cross section in accordance with the present teachings.
Figure 14B:
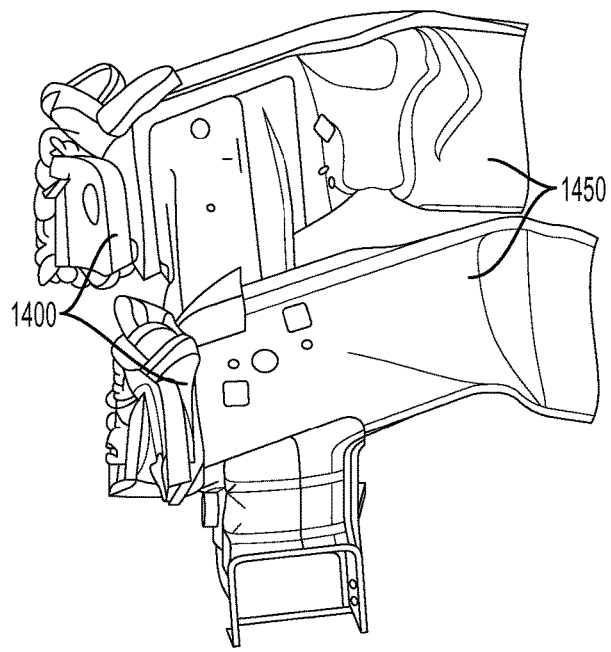
FIG. 14B depicts a stable axial crush resulting when an axial impact is applied along the longitudinal axis of the strengthening member of FIG. 14A.
Figure 15A:
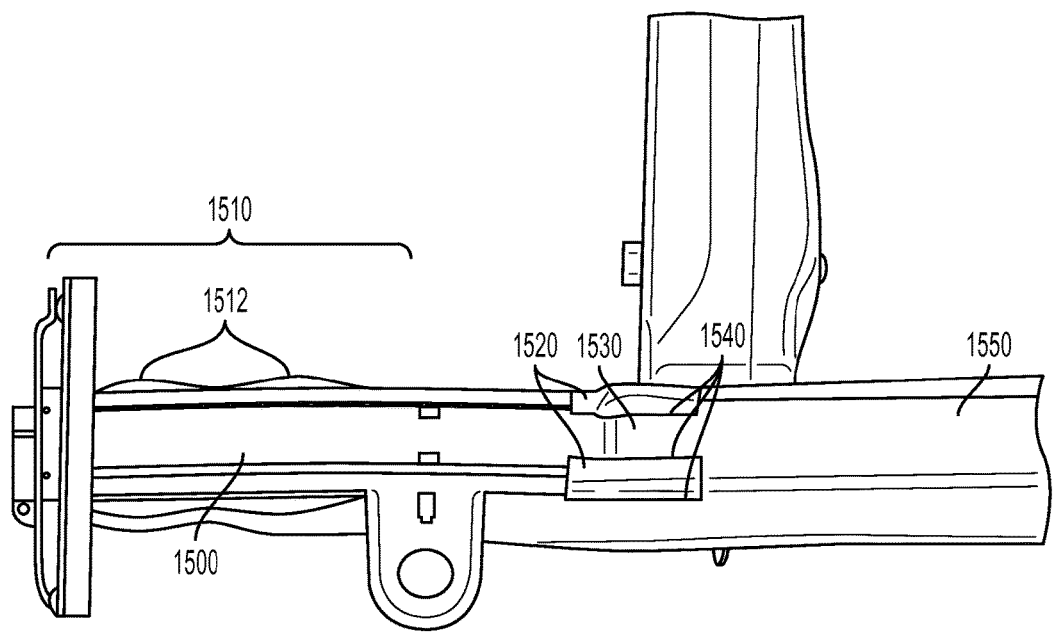
FIG. 15A is a perspective view of a fifth embodiment of a connection between a strengthening member having a twelve-cornered cross section and an automotive component having a four-cornered cross section in accordance with the present teachings.
Figure 15B:
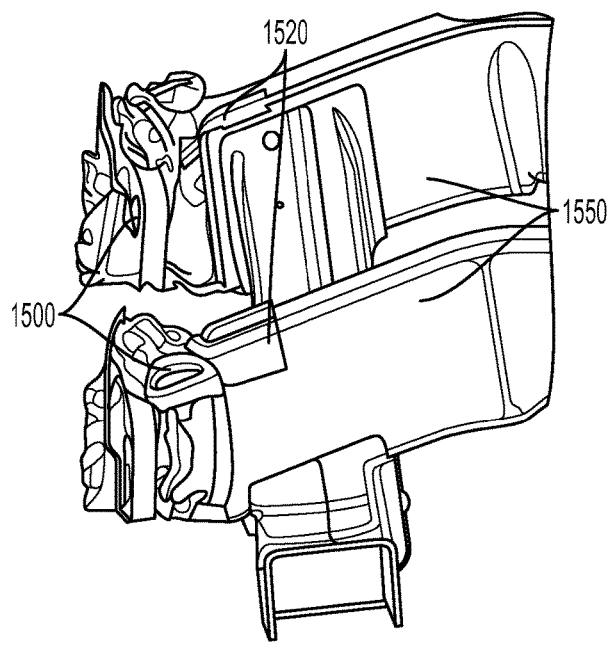
FIG. 15B depicts a stable axial crush resulting when an axial impact is applied along the longitudinal axis of the strengthening member of FIG. 15A.

FIGS. 14A and 15A are views of further exemplary embodiments of a connection between a twelve-cornered strengthening member 1400 or 1500 and a four-cornered automotive component 1450 or 1550. Strengthening members 1400, 1500 may respectively include tapered sections 1410, 1510 and/or protrusions 1412, 1512, as discussed in the exemplary embodiments herein. Further, the strengthening members may include bridge connection members. In the embodiments of FIGS. 14A and 15A, one or more bridging brackets 1420 or 1520 extend between the strengthening member 1400 or 1500 and the automotive component 1450 or 1550 at overlapping portions 1430 or 1530, respectively. For example, FIG. 14A depicts a strengthening member 1400 joined to an automotive component 1450 via a single bracket 1420 while FIG. 15A depicts a strengthening member 1500 joined to an automotive component 1550 via a plurality of brackets 1520. The brackets 1420 or 1520 may be secured by welding, such as at locations 1440 or 1540, or any other known means of attachment. This secure connection facilitates a stable axial crush, as shown in FIGS. 14B and 15B.

Brackets 1420, 1520 facilitate joining strengthening members 1400, 1500 and automotive components 1450, 1450 when they have differing cross-sections, as discussed above with regard to the exemplary embodiment of FIG. 12A. Other configurations are envisioned for the strengthening members and automotive components, such as a cross-section for strengthening members 1400, 1500 that transitions from a twelve-cornered cross-section to a four-cornered cross-section, as described above in regard to FIG. 10A.

Figure 16A:
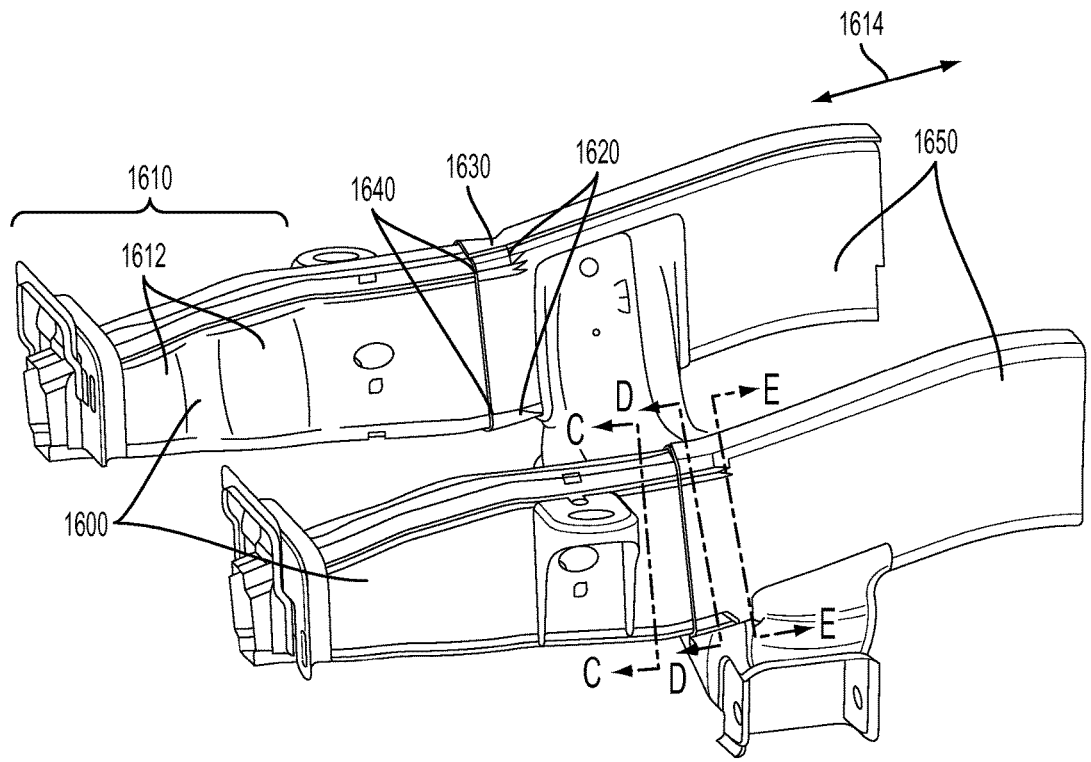
FIG. 16A is a perspective view of an embodiment of a connection between a strengthening member having a twelve-cornered cross section and an automotive component having a twelve-cornered cross section in accordance with the present teachings.
Figure 16B:
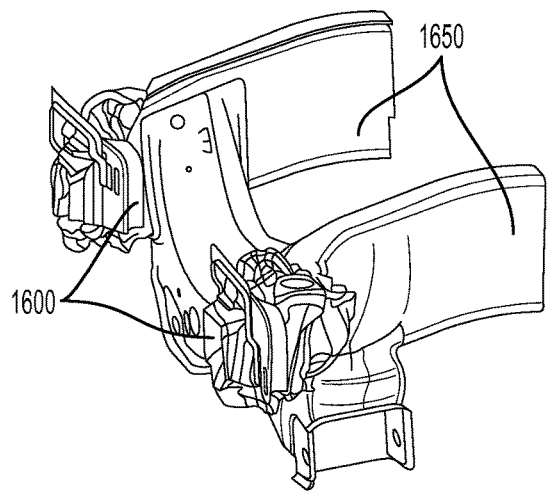
FIG. 16B depicts a stable axial crush resulting when an axial impact is applied along the longitudinal axes of the strengthening member and automotive component of FIG. 16A.

FIG. 16A is a view of another exemplary embodiment of a connection between a twelve-cornered strengthening member 1600 and a four-cornered automotive component 1650. Strengthening member 1600 may include a tapered section 1610 and/or protrusions 1612, as discussed in the exemplary embodiments herein. In FIG. 16A, the connection between strengthening member 1600 and automotive component 1650 comprises a transition 1620 at one end of the automotive component 1650 in which the cross-section of automotive component 1650 transitions from a twelve-cornered cross-section to a four-cornered cross section along at least a portion of automotive component 1650, such as along a longitudinal axis 1614 of automotive component 1650. As a result, the cross-section of the end of the automotive component 1650 at the connection may correspond to the cross-section of strengthening member 1600, which may have a twelve-cornered cross-sectional shape, as depicted in the exemplary embodiment of FIG. 16A. This configuration allows the strengthening member 1600 to be connected directly to the automotive component 1650 at overlapping portion 1630 by welding, such as at locations 1640, or other known means of attachment. The shape at the end of the transition will be substantially complementary to the shape of the strengthening member, so all of the corners and/or sides may be welded together to securely connect the strengthening member to the automotive component. This secure connection facilitates a stable axial crush, as shown in FIG. 16B.

Figure 16E:
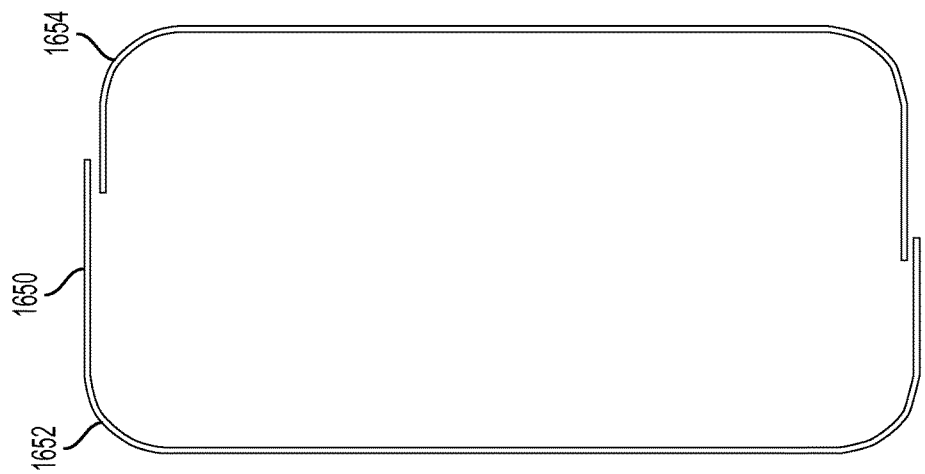
FIG. 16E is a cross-sectional view of the strengthening member of FIG. 16A taken along line E-E in FIG. 16A.
Figure 16D:
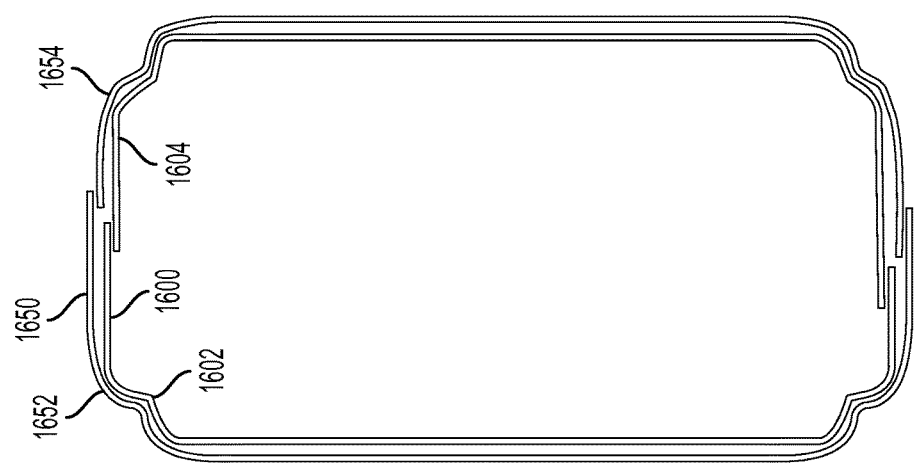
FIG. 16D is a cross-sectional view of the automotive component of FIG. 16A taken along line D-D in FIG. 16A.
Figure 16C:
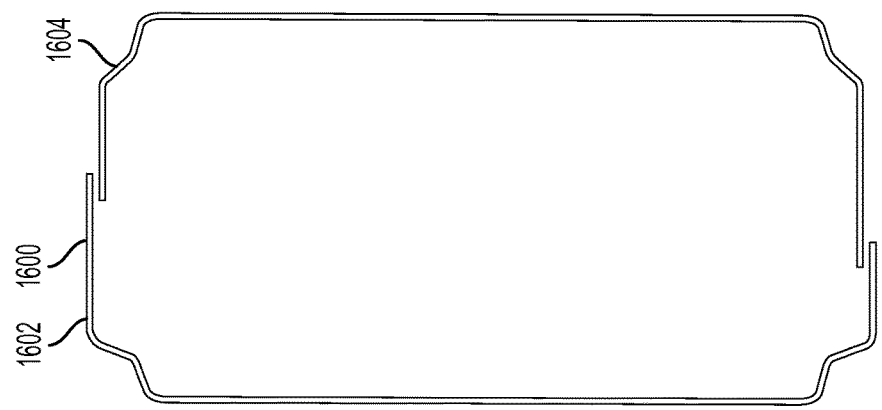
FIG. 16C is a cross-sectional view of the automotive component of FIG. 16A taken along line C-C in FIG. 16A.

FIGS. 16C-16E illustrate a transition from a four-cornered cross section to a twelve-cornered cross section of automotive component 1650. As depicted in FIGS. 16C-16E, strengthening member 1600 and automotive component 1650 may have two-part constructions respectively comprising pieces 1602, 1604 and 1652, 1654, or may have other constructions, as described above with regard to FIG. 9C. Further, FIG. 16C resembles the structures illustrated in at least FIGS. 1 and 7 and may have internal angles and external angles according to the various exemplary embodiments described herein. For example, the internal angles of the strengthening member may range from about 100° to about 110°, and the external angles may range from about 105° to about 130°.

FIG. 16C illustrates the strengthening member 1600, which is provided with a twelve-cornered cross section as previously discussed. In this exemplary embodiment, strengthening member 1600 does not include a transition to any other cross-sectional shape. Instead, the transitional structure is included in the automotive component 1650.

FIG. 16D is an exemplary embodiment of an overlapping portion in which the strengthening member 1600 is inserted into the automotive component 1650. As shown in the exemplary embodiment of FIG. 16D, the shape of the automotive component 1650 after the transition 1620 is substantially complementary to the twelve-cornered shape of the strengthening member 1600. The particular shapes and angles are not intended to limit the scope of the disclosure, and merely represent an exemplary embodiment for transitional cross-sections between a twelve-cornered cross section and a four-cornered cross section.

An amount of overlap 1630 between the strengthening member 1600 and the automotive component 1650 may depend on other dimensions, type of weld used, or which element is overlapping. For the exemplary embodiment of FIG. 16A, there may be an overlap 1630 of approximately 15 mm for flat weld joint. A transition 1620 of the automotive component 1650 from four corners to twelve corners may be located just after the overlapping portion 1630.

FIG. 16E is an exemplary embodiment of a four-cornered automotive component 1650 after the overlapping portion 1630. While the corners are shown as having a rounded shape, this particular shape is not intended to limit the claimed subject matter in any way.

Figure 17A:
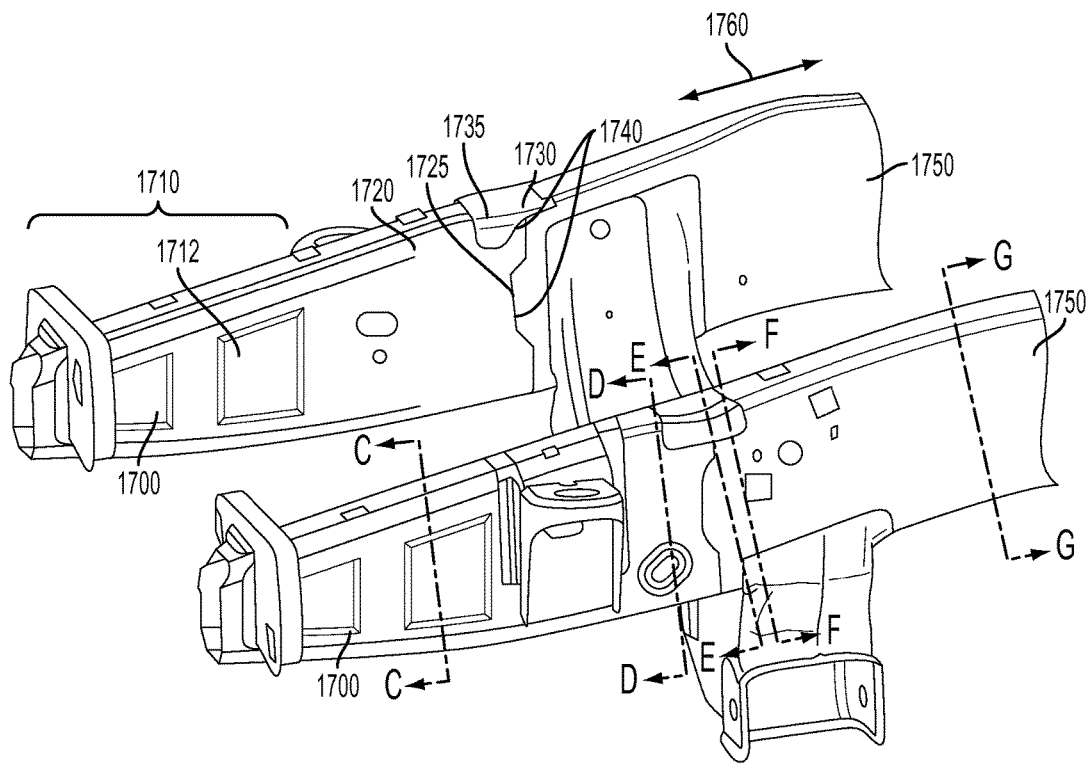
FIG. 17A is a perspective view of a connection between a strengthening member having a twelve-cornered cross section and an automotive component having a four-cornered cross section where a portion of the automotive component is received by the strengthening member in accordance with the present teachings.
Figure 17B:
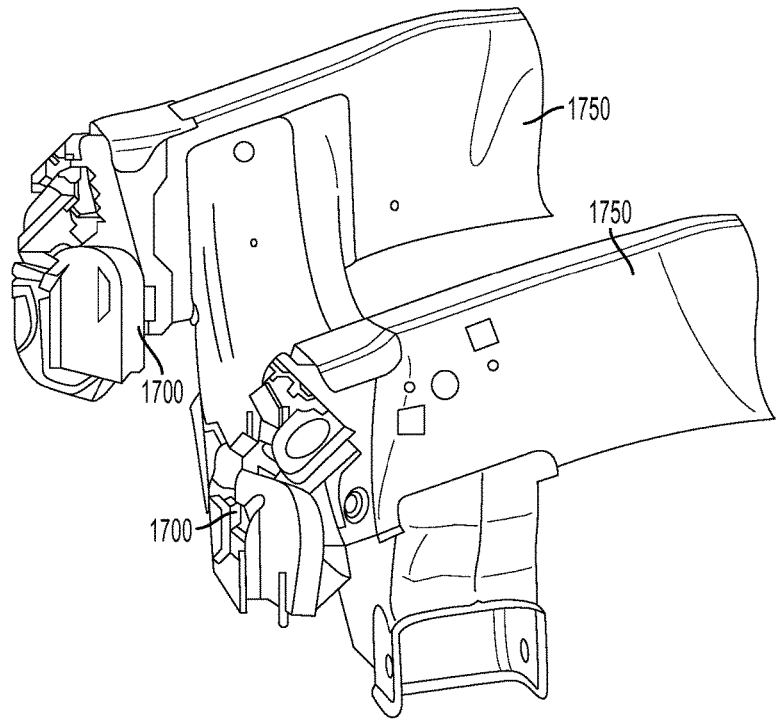
FIG. 17B depicts a stable axial crush resulting when an axial impact is applied along the longitudinal axes of the strengthening member and automotive component of FIG. 17A.

FIG. 17A is a view of another exemplary embodiment of a connection between a twelve-cornered strengthening member 1700 and a four-cornered automotive component 1750. Strengthening member 1700 may include a tapered section 1710 and/or protrusions 1712, as discussed in the exemplary embodiments herein. In FIG. 17A, the connection comprises a transition 1720 along at least a portion of the length of the strengthening member 1700 (e.g., along longitudinal axis 1760) from twelve corners to four corners, as well as a fish-mouth shaped cutouts 1725, and a mating component 1735. Mating component 1735 may be, for example, a bracket connected to outer or inner surfaces of the strengthening member 1700 and the automotive component 1750. The connection also comprises a fish-mouth weld joint as described above and illustrated by the fish-mouth shaped cutouts 1725 of the strengthening member 1700 at the overlapping portion 1730, along with welds, such as at locations 1740, or other known connections formed by other means of attachment as previously discussed. This secure connection facilitates a stable axial crush, as shown in FIG. 17B.

Figure 17G:
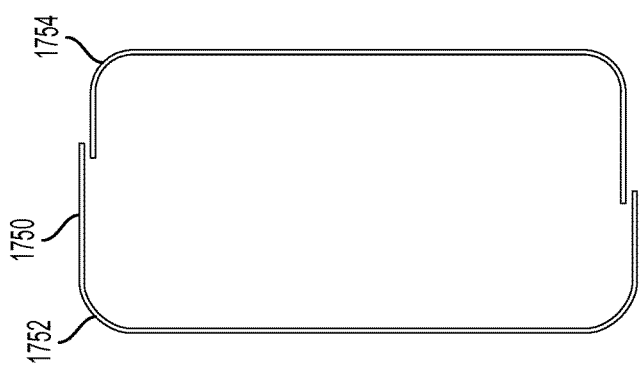
FIG. 17G is a cross-sectional view of the automotive component of FIG. 17A taken along line G-G in FIG. 17A.
Figure 17F:
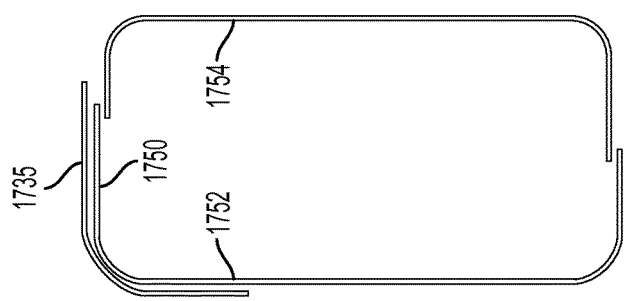
FIG. 17F is a cross-sectional view of the automotive component of FIG. 17A taken along line F-F in FIG. 17A.
Figure 17E:
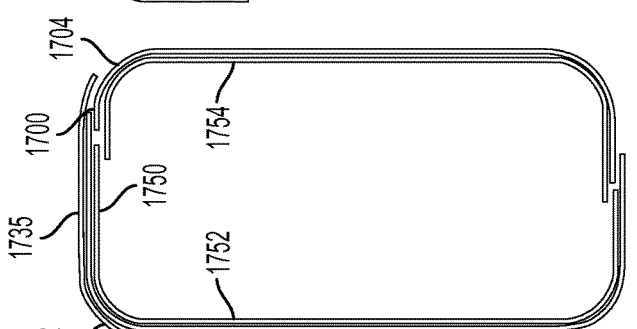
FIG. 17E is a cross-sectional view of the strengthening member of FIG. 17A taken along line E-E in FIG. 17A.
Figure 17D:
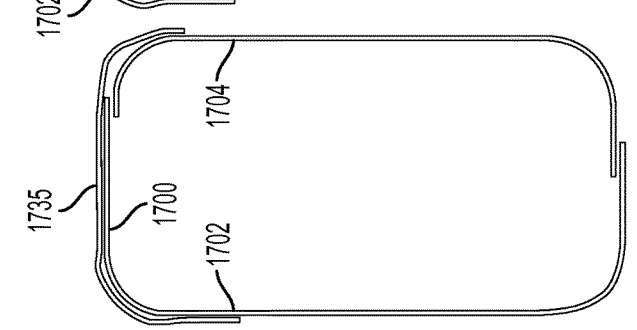
FIG. 17D is a cross-sectional view of the automotive component of FIG. 17A taken along line D-D in FIG. 17A.
Figure 17C:
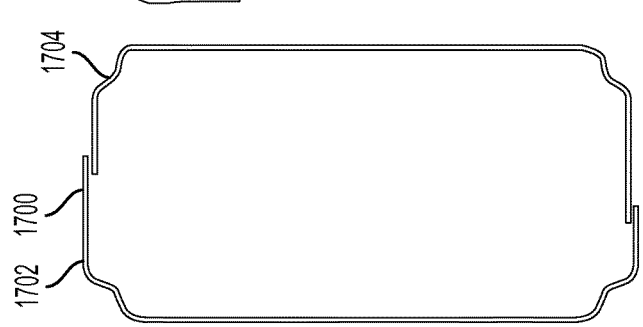
FIG. 17C is a cross-sectional view of the automotive component of FIG. 17A taken along line C-C in FIG. 17A.

FIGS. 17C-17G illustrate cross sections of the exemplary embodiment of FIG. 17A, in which the connection comprises the mating component 1735 and the fish-mouth weld joint including fish-mouth shaped cutouts 1725 and welds. FIG. 17C illustrates the strengthening member 1700, which is provided with a twelve-cornered cross section as previously discussed. In this exemplary embodiment, strengthening member 1700 includes a transition 1720 as discussed above. As depicted in FIGS. 17C-17G, strengthening member 1700 and automotive component 1750 may have two-part constructions respectively comprising pieces 1702, 1704 and 1752, 1754, or may have other constructions, as described above with regard to FIG. 9C. Further, FIG. 17C resembles the structures illustrated in at least FIGS. 1 and 7 and may have internal angles and external angles according to the various exemplary embodiments described herein. For example, the internal angles of the strengthening member may range from about 100° to about 110°, and the external angles may range from about 105° to about 130°.

FIG. 17D shows the strengthening member 1700 after the transition 1720 to four corners, with the mating component 1735 connected to an outer surface of the strengthening member 1700. It is also possible to connect the mating component 1735 to an inner surface of the strengthening member 1700.

FIG. 17E shows an exemplary embodiment of an overlapping portion 1730 where the automotive component 1750 is inserted into the strengthening member 1700, with the mating component 1735 still connected. As shown in the cross sections of the exemplary embodiment illustrated in FIGS. 17D-17E, the shape of the strengthening member 1700 may include the transition 1720 from a twelve-cornered cross section to a four-cornered cross section, as discussed in detail with respect to other embodiments.

FIG. 17F shows an exemplary embodiment of a four-cornered automotive component 1750 connected to the mating component 1735. FIG. 17G shows an exemplary embodiment of a four-cornered automotive component 1750 at a portion where the mating component 1735 is no longer connected. While the corners of the automotive component 1750 are shown as having a rounded shape, this particular shape is not intended to limit the claimed subject matter in any way.

As previously noted, it is also within the scope of the present invention to combine any of the embodiments disclosed above. For example, a connection may comprise a transition from twelve corners to four corners, or vice versa, a fish-mouth weld, and one or more mating components, as shown in FIGS. 9A-17B, or any other combination of the exemplary embodiments according to the present disclosure.

Figure 18:
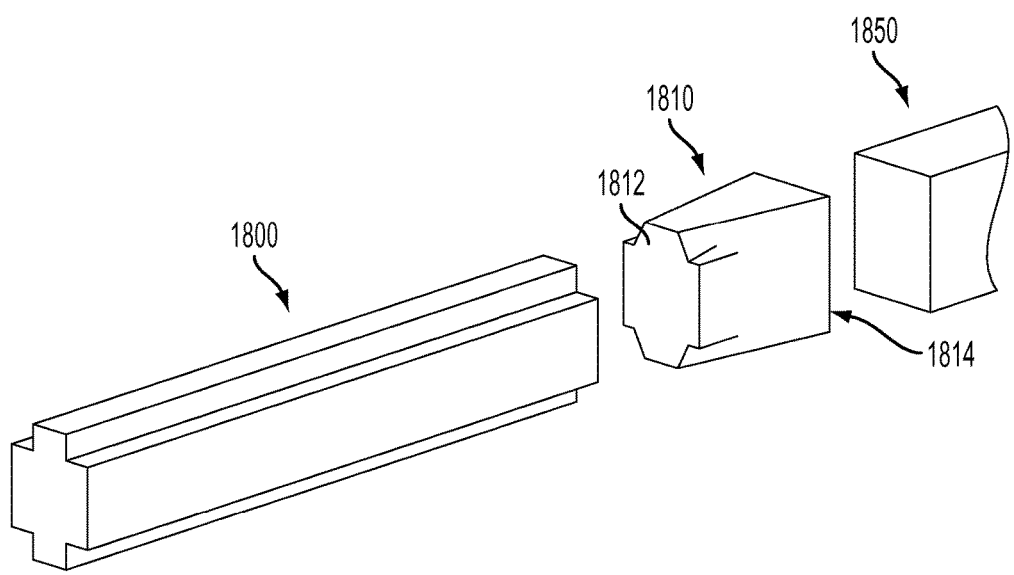
FIG. 18 is a perspective view of a connection between a strengthening member having a twelve-cornered cross section and an automotive component having a four-cornered cross section via a bridge connection member.

As discussed in the exemplary embodiments above, a bridge connecting member may be used to connect a strengthening member and an automotive component. The present disclosure contemplates bridge connecting members that include a transition from a twelve-cornered cross section to a four-cornered cross section to facilitate a connection between the strengthening member and the automotive component. Turning to FIG. 18, exemplary embodiments of a strengthening member 1800, automotive component 1850, and bridge connecting member 1810 to connect strengthening member 1800 and automotive component 1850 are shown. Strengthening member 1800 and automotive component 1850 may be configured according to the various exemplary embodiments described herein. For example, strengthening member 1800 may have a twelve-cornered cross-section (e.g., along an entire length of strengthening member 1800) and automotive component 1850 may have a four-cornered cross-section, as depicted in FIG. 18. To facilitate a connection between member 1800 and component 1850, bridge connecting member 1810 may transition from a twelve-cornered cross section, such as at a first end 1812 that connects to strengthening member 1800, to a four-cornered cross section, such as at a second end 1814 that connects to automotive component 1850. As a result, a strong connection between strengthening member 1800 and automotive component 1850 is facilitated, as a well as a stable axial collapse of strengthening member 1800.

While the present teachings have been disclosed in terms of exemplary embodiments in order to facilitate a better understanding, it should be appreciated that the present teachings can be embodied in various ways without departing from the scope thereof. Therefore, the invention should be understood to include all possible embodiments which can be embodied without departing from the scope of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A motor vehicle assembly, comprising:
    a strengthening member having a twelve-cornered cross section including sides and corners creating internal angles and external angles along at least a portion of the strengthening member, wherein each of the internal angles and the external angles is greater than 90 degrees and less than 180 degrees; and
    an automotive component having a four-cornered cross section along at least a portion of the automotive component;
    wherein the cross section of one of the strengthening member and the automotive component transitions between twelve corners and four corners to facilitate a connection between the strengthening member and the automotive component.

2. The assembly of claim 1, wherein the strengthening member and the automotive component are connected to one another such that one of the strengthening member and the automotive component is inserted into the other of the strengthening member and automotive component to form an overlapping portion, and wherein the transition from the twelve-cornered cross section to the four-cornered cross-section is at a region located adjacent to the overlapping portion.

3. The assembly of claim 2, wherein the transition is located in front of the overlapping portion with respect to a forward travel direction of the motor vehicle.

4. The assembly of claim 2, wherein the overlapping portion has a length of about 15 mm to about 25 mm, and wherein the overlapping portion includes a flat weld joint.

5. The motor vehicle assembly of claim 1, wherein the cross section of the strengthening member tapers along a portion of a length of the strengthening member.

6. The motor vehicle assembly of claim 2, wherein one of the portions of the strengthening member and the automotive component forming the overlapping portion comprises a fish-mouth shaped cutout for a weld joint to connect the strengthening member and the automotive component.

7. A strengthening member for an automotive vehicle, comprising:
    a first end having a twelve-cornered cross section including sides and corners creating internal angles and external angles,
    a second end configured to connect to a four-cornered cross section of another automotive component, and
    a protrusion on each of first and second opposite sides of the strengthening member, the protrusions being configured to facilitate a stable axial collapse of the strengthening member, wherein each of the protrusions has an undulating shape.

8. The strengthening member of claim 7, wherein the cross section of the strengthening member transitions along a length of the strengthening member from the twelve-cornered cross section at the first end to a four-cornered cross-section at the second end.

9. The strengthening member of claim 7, wherein each of the protrusions are disposed on a portion of the strengthening member having the twelve-cornered cross section.

10. The strengthening member of claim 7, wherein the protrusions are on opposite lateral surfaces of the strengthening member, and wherein each protrusion extends along a portion of the lateral surface on which it is disposed in a top-to-bottom direction with respect to the automotive vehicle such that flat portions of the lateral surface are present between each protrusion and corners that form a top edge and a bottom edge of the lateral surface.

11. The strengthening member of claim 10, wherein each protrusion extends over about 30% to about 60% of a height of the lateral surface in the top-to-bottom direction.

12. The strengthening member of claim 10, wherein each protrusion extends from the lateral surface on which it is disposed to increase a width of the strengthening member in a direction transverse to a front-rear direction of the vehicle by an amount ranging from about 5% to about 10%.

13. The strengthening member of claim 7, wherein each of the protrusions is work hardened.

14. A strengthening member for an automotive vehicle, comprising:
    a first portion having a twelve-cornered cross section including sides and corners creating internal angles and external angles;
    a second portion having a four-cornered cross section configured to connect to a four-cornered cross section of another automotive component; and
    a tapered portion comprising a first substantially horizontal surface and a second surface, directly opposite the first, that slopes relative to the first surface.

15. The strengthening member of claim 14, wherein the tapered portion of the strengthening member has a twelve-cornered cross section throughout a length of the tapered portion.

16. The strengthening member of claim 14, wherein the strengthening member has a mean crush force from about 100 kN to about 200 kN at a crush distance of 150 mm or more when axially impacted with a rigid wall at 35 mph.

17. The strengthening member of claim 14, wherein the strengthening member has a mean crush force from about 100 kN to about 300 kN at a crush distance of 400 mm or more when axially impacted with a rigid wall at 35 mph.

18. The strengthening member of claim 14, wherein the strengthening member has a mean crush force from about 200 kN to about 300 kN at a crush distance of 400 mm or more when axially impacted with a rigid wall at 35 mph.

19. The strengthening member of claim 14, wherein a cross-sectional area of the tapered portion in a plane transverse to a front-to-rear direction of the vehicle varies from about 30% to about 70% along a length of the tapered portion.

20. The strengthening member of claim 14, wherein the second surface is a top surface of the tapered portion that is sloped along a length of the strengthening member that is parallel to a front-to-rear direction of the vehicle, and wherein the first surface is a bottom surface of the tapered portion that is substantially horizontally straight along the length of the strengthening member that is parallel to the front-to-rear direction of the vehicle, wherein the tapered portion is configured to direct an axial crush of the strengthening member away from the second portion.

* * * * *